US011952923B2

(12) United States Patent
Baltrucki

(10) Patent No.: US 11,952,923 B2
(45) Date of Patent: Apr. 9, 2024

(54) SELECTIVE RESETTING LOST MOTION ENGINE VALVE TRAIN COMPONENTS

(71) Applicant: Jacobs Vehicle Systems, Inc., Bloomfield, CT (US)

(72) Inventor: Justin D. Baltrucki, Canton, CT (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 421 days.

(21) Appl. No.: 16/743,183

(22) Filed: Jan. 15, 2020

(65) Prior Publication Data

US 2020/0224561 A1 Jul. 16, 2020

Related U.S. Application Data

(60) Provisional application No. 62/792,507, filed on Jan. 15, 2019.

(51) Int. Cl.
*F01L 1/24* (2006.01)
*F01L 9/12* (2021.01)

(52) U.S. Cl.
CPC ............... *F01L 1/2416* (2013.01); *F01L 9/12* (2021.01)

(58) Field of Classification Search
CPC ....... F01L 1/181; F01L 1/2416; F01L 1/2422; F01L 1/267; F01L 13/0015; F01L 9/12; F01L 2810/02; F01L 2013/105; F01L 2820/01; F02D 13/0226; F02D 13/0269; Y02T 10/12
USPC ...................................................... 123/90.46
See application file for complete search history.

(56) References Cited

U.S. PATENT DOCUMENTS

| | | | |
|---|---|---|---|
| 6,694,933 B1 | 2/2004 | Lester | |
| 7,905,208 B2 | 3/2011 | Ruggiero et al. | |
| 2001/0027773 A1 | 10/2001 | Janak et al. | |
| 2003/0024501 A1* | 2/2003 | McCarthy | F01L 13/065 123/321 |
| 2008/0006231 A1 | 1/2008 | Noss et al. | |

(Continued)

FOREIGN PATENT DOCUMENTS

| | | |
|---|---|---|
| EP | 1222374 A1 | 7/2002 |
| JP | S59051116 A | 3/1984 |

(Continued)

OTHER PUBLICATIONS

International Search Report for International Application No. PCT/US2020/013633 dated Apr. 21, 2020, 3 pages.

(Continued)

*Primary Examiner* — Kenneth J Hansen
*Assistant Examiner* — Kelsey L Stanek
(74) *Attorney, Agent, or Firm* — Moreno IP Law LLC

(57) ABSTRACT

Systems and related methods include a rocker arm having integrated components, including a lost motion actuator piston and components for resetting the lost motion actuator piston to provide normal valve closing or late valve closing. Selective reset is facilitated by a reset piston and a blocking piston disposed in a hydraulic circuit including a reset passage. In a non-resetting mode of operation, the blocking piston may block oil flow within the reset passage, regardless of the position of the reset piston, which facilitates late valve closing. An alternative embodiment includes a blocking sleeve disposed concentrically relative to the reset piston.

21 Claims, 16 Drawing Sheets

(56) References Cited

U.S. PATENT DOCUMENTS

2016/0025018 A1\* 1/2016 Gustafson ............. F01L 13/065
                                                          123/321
2016/0146074 A1    5/2016 Lynch
2018/0298795 A1\* 10/2018 Cecur ................. F02D 13/0269
2019/0293001 A1\*  9/2019 Baltrucki ................ F01L 1/181

FOREIGN PATENT DOCUMENTS

WO    2014047643 A1    3/2014
WO    2016011109 A1    1/2016

OTHER PUBLICATIONS

Written Opinion of the ISA for International Application No. PCT/US2020/013633 dated Apr. 21, 2020, 3 pages.
Extended European Search Report for European Patent Application No. 20741176.0 dated Aug. 9, 2022, 9 pages.
Translation of Notice of Reasons for Refusal for Japanese Patent Application No. 2021-540798 dated Aug. 2, 2022, 2 pages.

\* cited by examiner

SELECTIVE RESETTING LOST MOTION ENGINE VALVE TRAIN COMPONENTS

RELATED APPLICATIONS AND PRIORITY CLAIM

The instant application claims priority to U.S. provisional patent application Ser. No. 62/792,507, filed on Jan. 15, 2019 and titled LOST MOTION SELECTIVE RESETTING ROCKER ARM. The subject matter of this provisional application is incorporated by reference herein in its entirety.

FIELD

The instant disclosure relates generally to systems and methods for actuating one or more engine valves in an internal combustion engine. More particularly, the instant disclosure relates to systems and methods for varying the operational relationship between a motion source, such as a cam, and one or more engine valves, to provide, for example, variable valve actuation (VVA) for intake valves in a pushrod engine or in a space-constrained engine, and, for example, to provide two-position intake valve lift in which the first position may be normal valve closing and the second position may be late valve closing.

BACKGROUND

Internal combustion engines are utilized ubiquitously in many applications and industries, including transportation and trucking. Valve actuation systems for use in internal combustion engines are well known in the art. Such systems typically include one or more intervening components that convey valve actuation motions from a valve actuation motion source (e.g., a cam) to one or more engine valves, the intervening components constituting a valve train. These valve actuation systems may primarily facilitate a positive power mode of operation in which the engine cylinders generate power from combustion processes. The intake and exhaust valve actuation motions associated with the standard combustion cycle are typically referred to as "main event" motions. Known engine valve actuation systems may provide for modified main event valve motion, such as early or late intake valve closing.

Internal combustion engines may utilize a thermodynamic cycle known as a Miller cycle, which typically involves late closing of the intake valve (LIVC) to achieve desirable performance and emissions objectives. LIVC may result in a reduced engine compression ratio for improved emissions and fuel consumption under certain operating conditions. However, LIVC may not be desirable under all engine operating conditions. For example, during transient conditions, such as startup conditions, when there may be inadequate intake charge or pressure from a turbocharger, the system may need to run at full compression ratio. On the other hand, during steady state or normal operation, when adequate turbocharger boost pressure is available, LIVC can provide reduced NOx emissions and improved fuel consumption. As such, past efforts in the art have attempted to provide valve actuation systems that are capable of quickly and reliably transitioning from normal to late closing cycles on demand and as needed in order to fully realize the benefits offered by LIVC across a wide range of speeds, loads and other operating parameters that characterize typical operating environments for diesel and other engines.

Prior art systems that have attempted to address the above needs have included lost motion resetting rocker brake systems, or bridge brakes. For example, prior art systems developed by Jacobs Vehicle Systems, Inc., include resetting bridge brakes, such as those described in U.S. Pat. No. 7,905,208, the subject matter of which is incorporated herein by reference. These systems can add motion or lose motion (reset) based on control of the flow and/or pressure of oil supplied to the braking rocker arm. Known prior art systems are characterized by larger implementation costs and packaging that is not readily adaptable to many engine environments. For example, on a pushrod engine, it may not be possible to have added cam lobes and rocker arms to provide desired modified main event valve closing motion. The motion must come from the single cam lobe and pushrod. On some overhead cam engines there may not be enough space on the valvetrain for additional rockers and a lost motion intake may still be the best option for providing 2-position VVA/lost motion.

In some applications, it may be desirable to have selective reset that may facilitate two alternative valve closing profiles, such as normal valve closing and late valve closing, where reset is based, for example, on an engine parameter, such as engine load, engine speed or engine temperature. Since the system always has oil during opening to provide normal opening, it may not be desired to modify the opening of the intake valve in either operating mode. It would be desirable to provide a system that may utilize the availability of oil at beginning of the main event, and has selective resetting to either be filled with oil at closing, or to be drained of oil at closing. In the event that the engine is starting up and no oil pressure is available, such a lost motion system may default to mechanical lift providing a late opening and a normal closing main event. The late opening will have a minor impact on air flow, and the normal closing will provide a normal compression ratio to start the engine. Other systems that have early closing as the default lift will have potentially low compression ratio at startup, and therefore have difficulty with cold engine startup. Thus, it would be desirable to have a system that provides for leaving the intake motion profile of main event intake opening profile intact while making available the switching between two different main event intake closing profiles.

It would therefore be advantageous to provide systems and methods that address the aforementioned shortcoming and others in the prior art.

SUMMARY

Responsive to the foregoing challenges in the prior art, the instant disclosure provides various embodiments of resetting lost motion systems, which meet the above challenges and provide improved operating characteristics and performance.

The above-mentioned difficulties may be overcome based on aspects reflected in the various embodiments disclosed herein. The disclosed advances are particular advantageous in providing rocker arm components that facilitate main event motion having unmodified opening and modified closing, while offering a compact package that integrates resetting components and reset blocking components.

As used herein, the term "component" denotes structure that includes either a single element or part, or a combination of elements or parts, to achieve an operational result associated with the component.

Implementations according to the disclosure provide resetting lost motion features in a rocker arm, or other valve train component, which eliminate the need for complex reset control components that would otherwise be situated external to the valve train component. A hydraulic control circuit may be integrated into the rocker arm. Advantageously, the reset components that perform reset of the lost motion component, as well as the control components that may perform blocking or unblocking of the reset component, and all hydraulic passages connecting these components, may be integrated, and packaged compactly and internally within the rocker arm.

Implementations according to the disclosure also provide valve train components, such as rocker arms, with resetting lost motion components and associated resetting systems that may be selectively turned "on" and "off" to provide either normal valve closing or late valve closing, respectively. Such systems may utilize a constant supply of hydraulic working fluid, such as oil, provided through existing engine working fluid distribution systems (rocker shaft and journal passages). Moreover, all of the dynamic (moving) parts associated with the reset system may be integrated into a rocker arm to provide compact packaging suitable for space constrained engine overhead environments. The integrated reset components may facilitate the resetting by fixed objects/surfaces in the engine overhead environment, such as simple contact surfaces or points arranged to engage the reset piston, which may extend from the valve train component (rocker arm) into which it is integrated. Embodiments described herein eliminate need for complex external reset triggering components.

According to an aspect of the disclosure, there is provided a valve actuation system for conveying motion from a motion source to at least one engine valve in a valve train in an internal combustion engine comprising: a housing adapted to support components of the system; a lost motion component disposed in the housing for selectively conveying motion from the motion source to the housing, the lost motion component adapted to absorb motion provided from the motion source in a lost motion state; a reset component for resetting the lost motion component to the lost motion state; and a reset blocking component for selectively preventing reset of the lost motion component.

According to a further aspect, the reset component may comprise a reset piston and the blocking component may comprise a blocking piston. In a non-resetting mode of operation, the blocking piston blocks flow in a reset passage regardless of the position of the reset piston. In a resetting mode of operation, the blocking piston allows resetting of the lost motion component by the reset piston. The reset piston may extend from the rocker arm housing such that the reset piston engages a fixed reaction or contact surface when the rocker arm moves to a predetermined rotational position in order to facilitate reset or motion loss in the actuator piston.

According to a further aspect, the reset component may comprise a reset piston, and the reset blocking component may comprise a blocking sleeve disposed concentrically relative to the reset piston. In a non-resetting mode of operation, the blocking sleeve blocks flow in a reset passage regardless of the position of the reset piston. In a resetting mode of operation, the blocking sleeve allows resetting of the lost motion component by the reset piston.

According to further aspects, the system may comprise a working fluid circuit, which may further comprise a supply and backflow prevention component, such as a check valve, the working fluid circuit being at least partially defined in the housing for controlling the flow of fluid to the lost motion component.

According to a further aspect, there is provided a method of controlling valve motion in a valve actuation system in an internal combustion engine, the valve actuation system comprising: a motion source; a housing; a lost motion component disposed in the housing for selectively conveying motion from the motion source to the housing, the lost motion component adapted to absorb motion provided from the motion source in a lost motion state; a reset component for resetting the lost motion component to the lost motion state; and a reset blocking component for selectively preventing reset of the lost motion component, the method comprising: operating the reset component to cause the lost motion component to at least partially absorb motion from the motion source; and operating the reset blocking component to block resetting of the lost motion component.

Other aspects and advantages of the disclosure will be apparent to those of ordinary skill from the detailed description that follows and the above aspects should not be viewed as exhaustive or limiting. The foregoing general description and the following detailed description are intended to provide examples of the inventive aspects of this disclosure and should in no way be construed as limiting or restrictive of the scope defined in the appended claims.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples according to aspects of the disclosure and are not intended to be limiting to the scope of invention, which is set forth in the claims appended hereto. In the following descriptions of the figures, all illustrations pertain to features that are examples according to aspects of the instant disclosure, unless otherwise noted.

DETAILED DESCRIPTION

Figure 1:
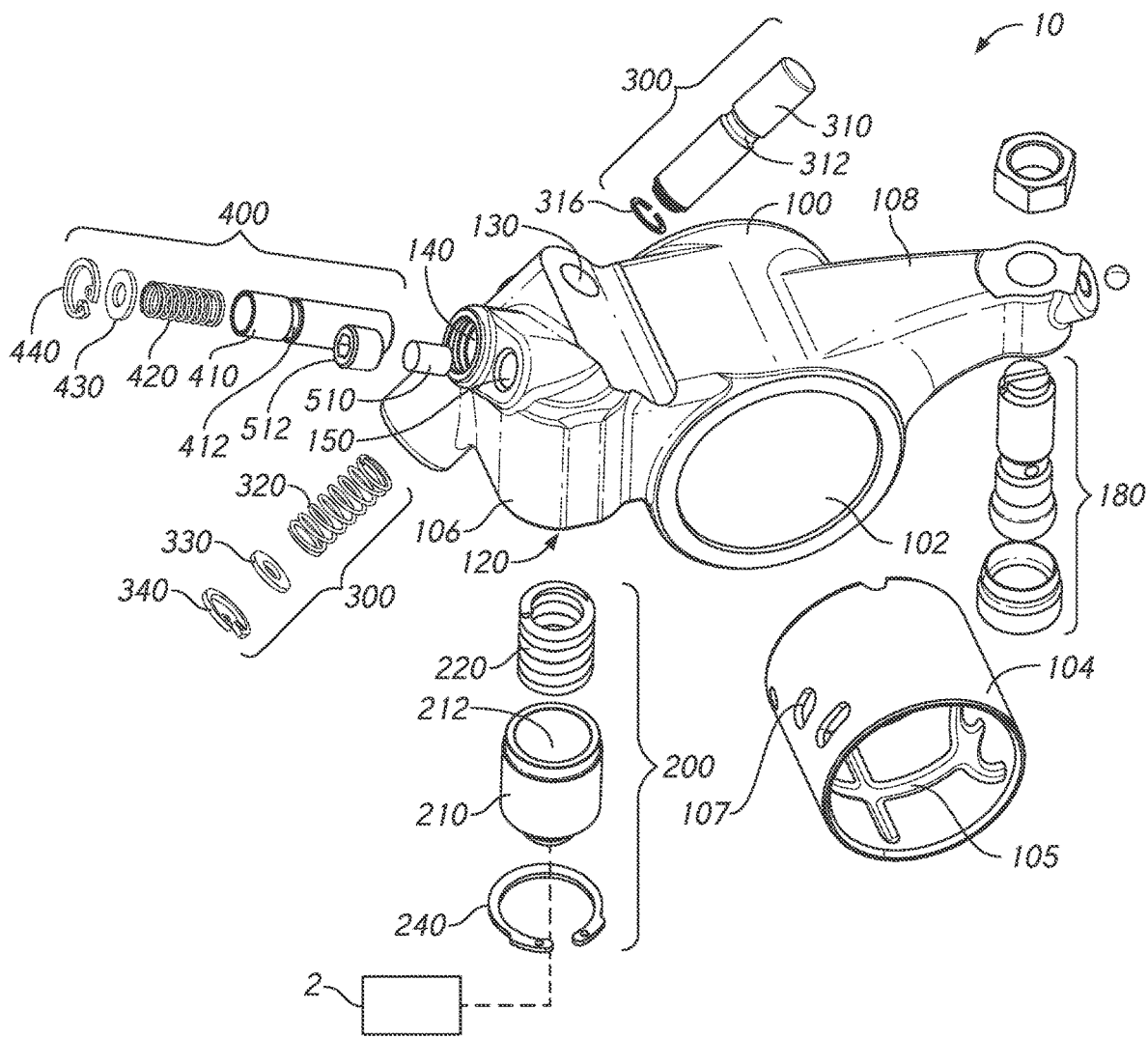
FIG. 1 is an exploded perspective view of first example rocker arm having integrated lost motion resetting components.
Figure 2:
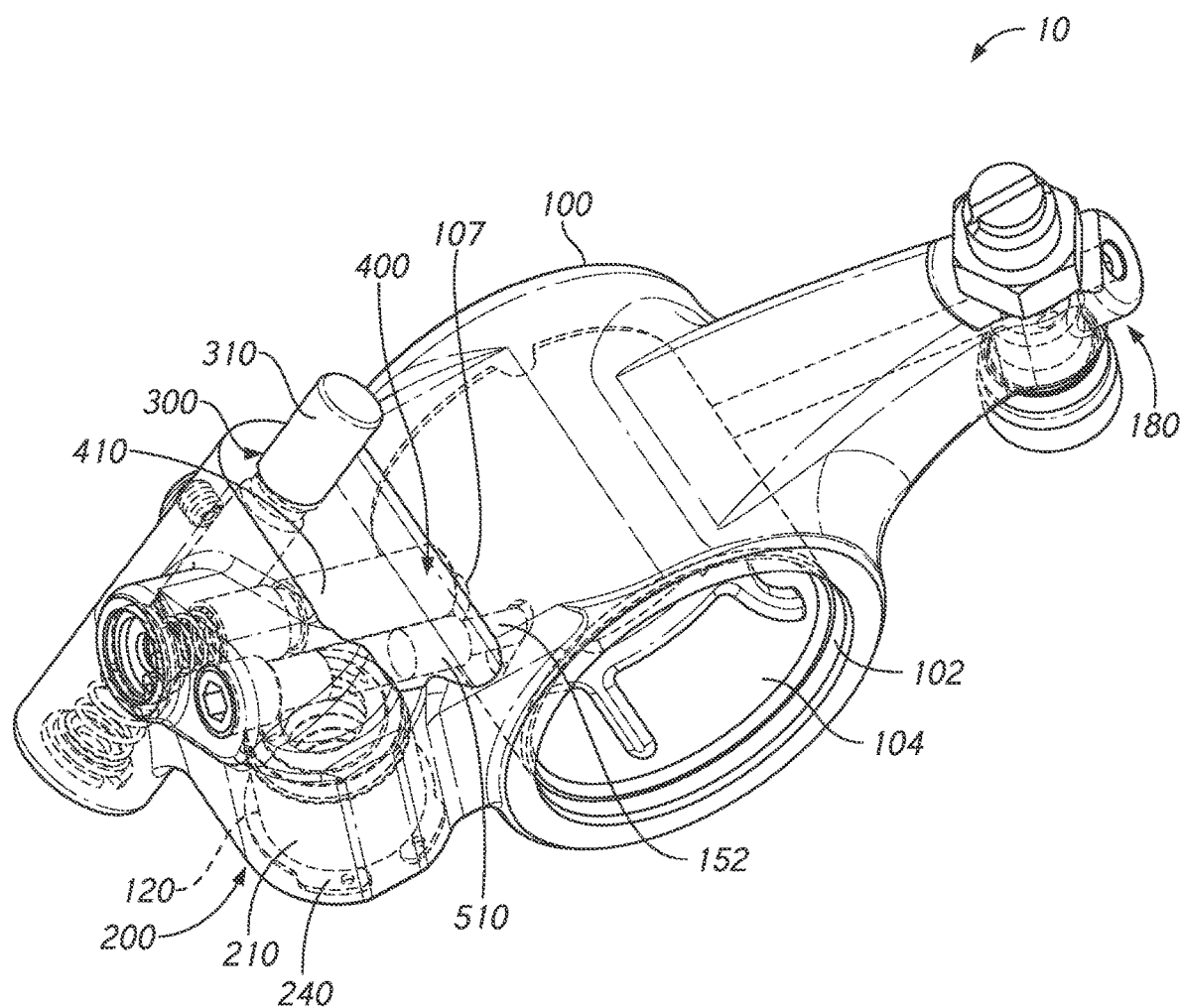
FIG. 2 is an assembled front perspective of the rocker arm of FIG. 1.
Figure 3:
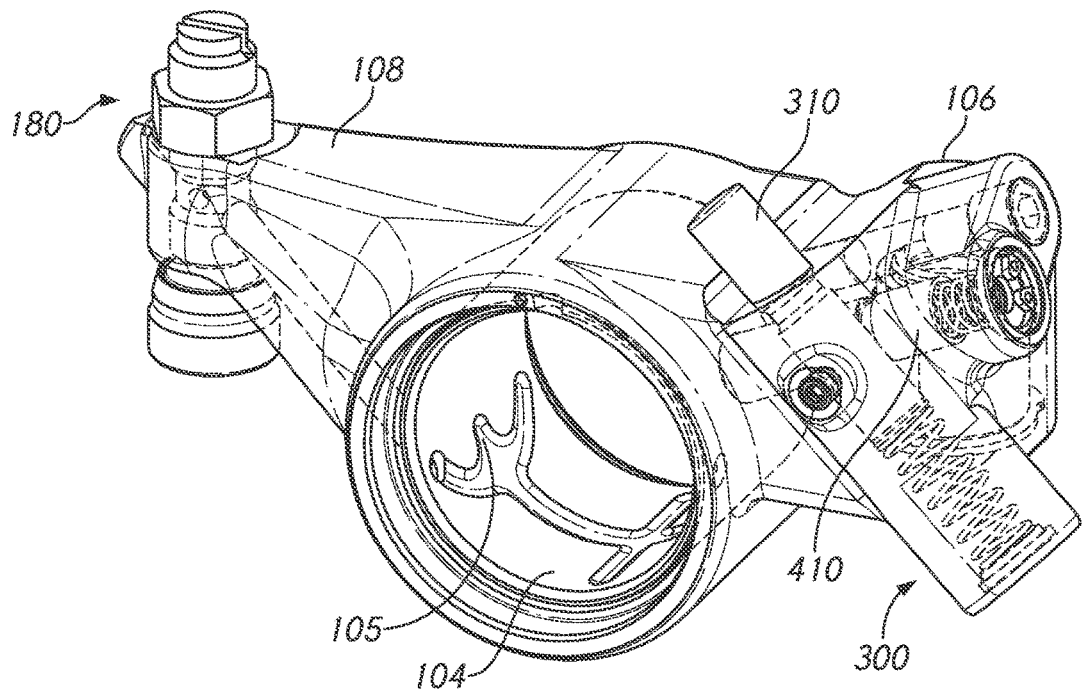
FIG. 3 is an assembled rear perspective of the rocker arm of FIG. 1.

FIGS. 1-10 illustrate a first example valve train component in the form of a rocker arm 10, in accordance with aspects of the disclosure. Referring particularly to FIGS. 1 and 2, rocker arm 10 may typically include a housing or rocker arm body 100 having a central journal portion 102. A motion receiving portion 106, which may receive motion from a motion source 2 (FIG. 1) (i.e., cam) and motion conveying end 108 may extend in opposite directions from the central journal portion 102. Motion conveying end may include an adjustable e-foot or swivel foot assembly 180 for engaging a valve bridge. Motion receiving end 106 may include an actuator piston assembly 200 housed therein to receive motion from the motion source through other valve train components, such as a pushrod. In accordance with aspects of the disclosure, the rocker arm body 100 may house and integrate an actuator piston assembly 200, a reset piston assembly 300 and a blocking piston assembly 400. An actuator piston bore or cavity 120 may house the actuator piston assembly 200. A reset piston bore or cavity 130 may house the reset piston assembly 300, which may also be termed an integrated reset component, and a blocking piston bore or cavity 140 may house the blocking piston assembly 400, which may also be termed a blocking component. A check valve 510 may be disposed in a check valve bore or cavity 150, which may extend to the rocker shaft journal and may be plugged by a threaded check valve bore plug 512. A rocker journal bushing and oil guide 104 may be disposed in the rocker journal to reduce wear and friction and to guide engine oil from an oil passage in the rocker shaft, via channels 105 to one or more ports 107 and further to corresponding ports in the rocker arm body 100 to provide working fluid to the various components integrated therein, as will further be described.

Figure 4:
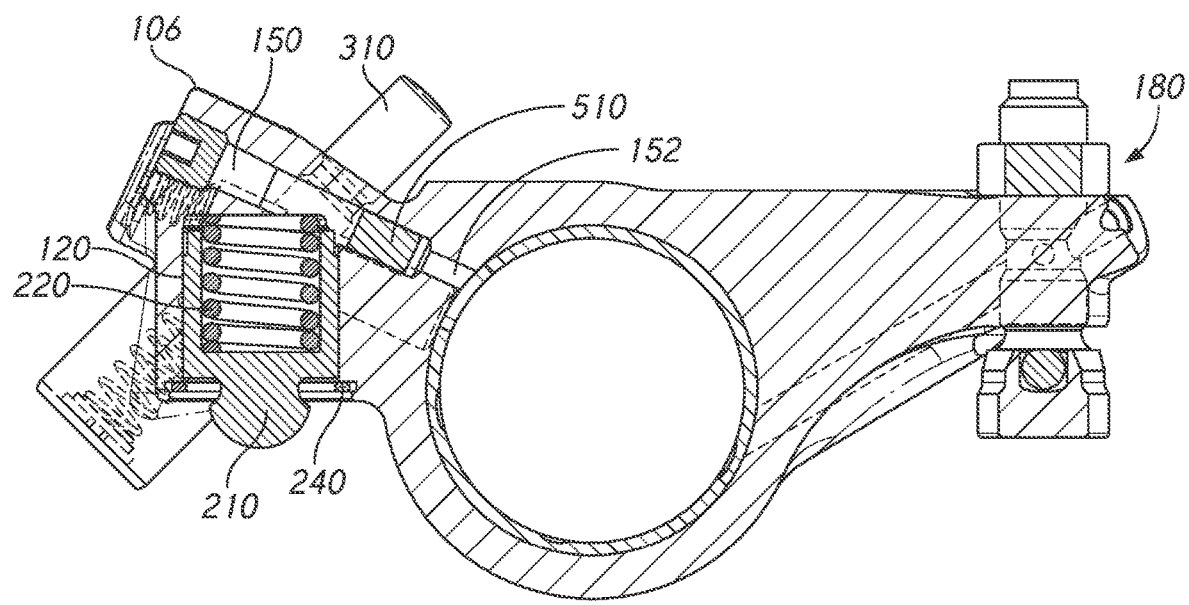
FIG. 4 is a cross-section in a longitudinal plane of the rocker arm of FIG. 1.

Referring more particularly to FIGS. 1, 2 and 4, actuator piston assembly 200, which may constitute a lost motion component, may include an actuator piston 210, sized to slide within and provide substantial sealing engagement with actuator piston bore or cavity 120. Actuator piston may be formed as a hollow element with a cavity 212, which may house a biasing element, such as a coil spring 220, which may bias the actuator piston 210 in an extended direction (out of its bore) to manage inertia of the push rod or other valve train components, such as a cam follower cooperating with a cam motion source. For example, when the system is filling with oil the spring may maintain contact between the actuator piston, pushrod, cam follower, and camshaft. A spring clip retainer 240 may secure the actuator piston and spring 220 within the actuator piston cavity 120. As best seen in FIG. 4, actuator piston 210 may define an expandable actuator piston chamber with the piston actuator bore 120. A supply passage 152 in the rocker arm body 100 may provide a constant flow of working fluid (engine oil) from the rocker shaft supply, through check valve 510 to the actuator piston chamber. Actuator piston 210 may function to vary the lash in the valve train between the rocker arm 10 and the motion source (cam). As will be further described, the motion of actuator piston assembly 200 may be controlled via the integrated reset component 300 and blocking component 400 to selectively provide for variations in valve motion (lost motion), to facilitate desirable operations, such as late intake valve closing.

Figure 5:
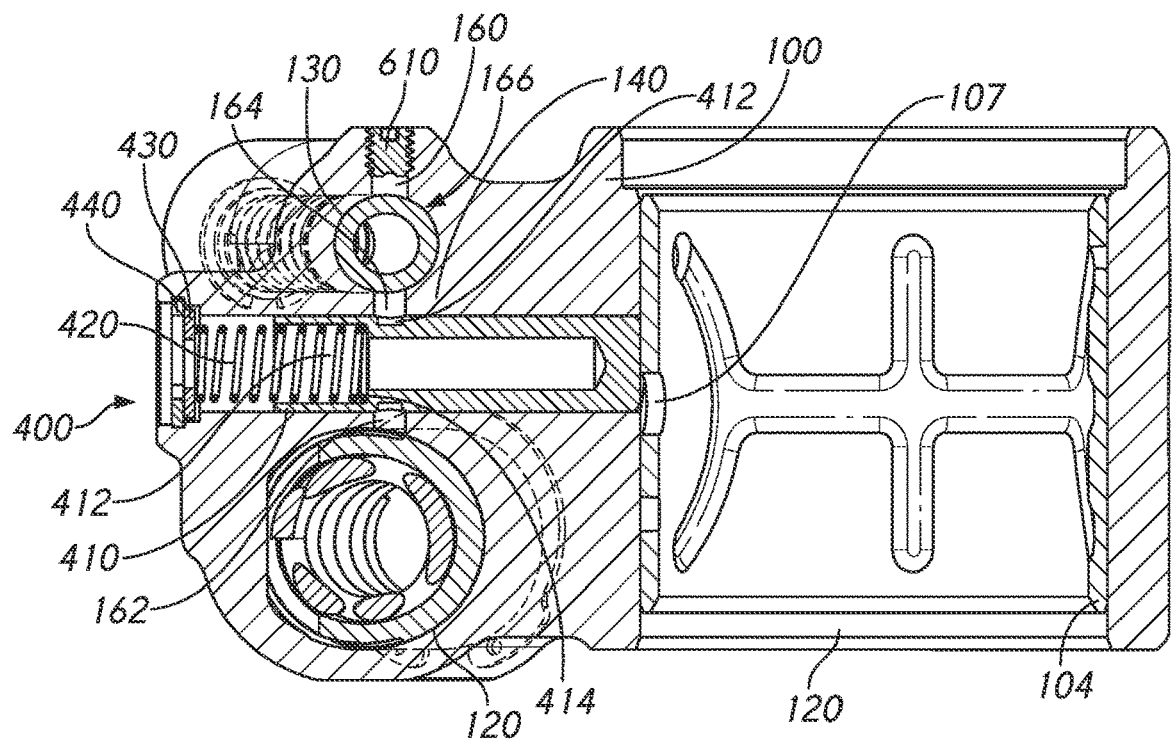
FIG. 5 is a cross-section in a transverse plane of the example rocker arm of FIG. 1, showing a blocking piston in a resetting position or state, in which reset is allowed to occur. The plane of this view coincides with the axis of the blocking piston.
Figure 6:
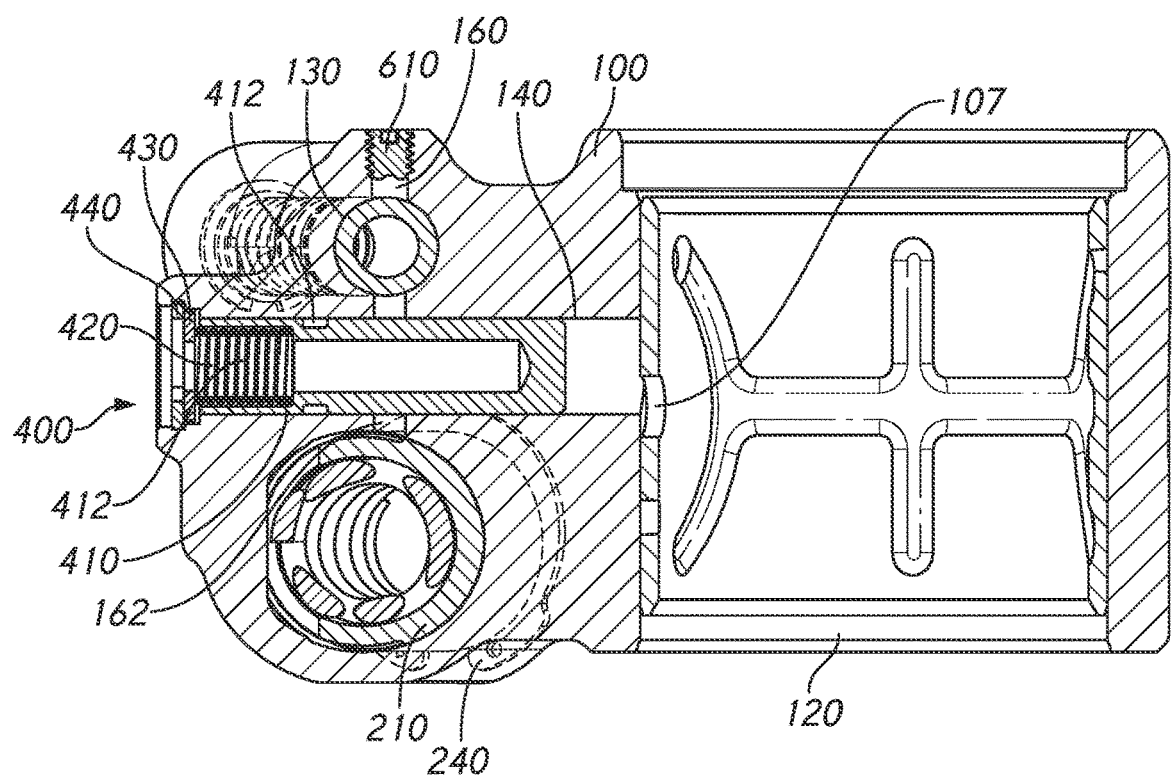
FIG. 6 is a cross-section in a transverse plane of the example rocker arm of FIG. 1, showing a blocking piston in a non-resetting position or state, in which reset is not allowed to occur. The plane of this view coincides with the axis of the blocking piston.
Figure 7:
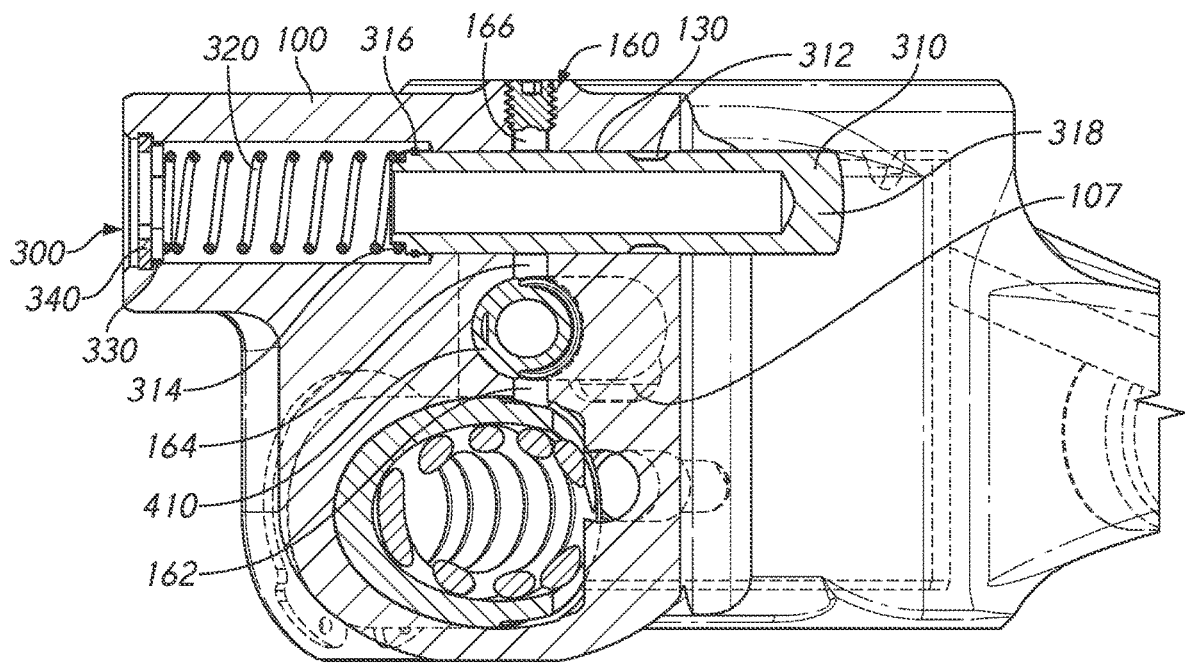
FIG. 7 is cross-section in a transverse plane of the example rocker arm of FIG. 1, showing a reset piston in a base circle position or state. The plane of this view coincides with the axis of the reset piston.
Figure 8:
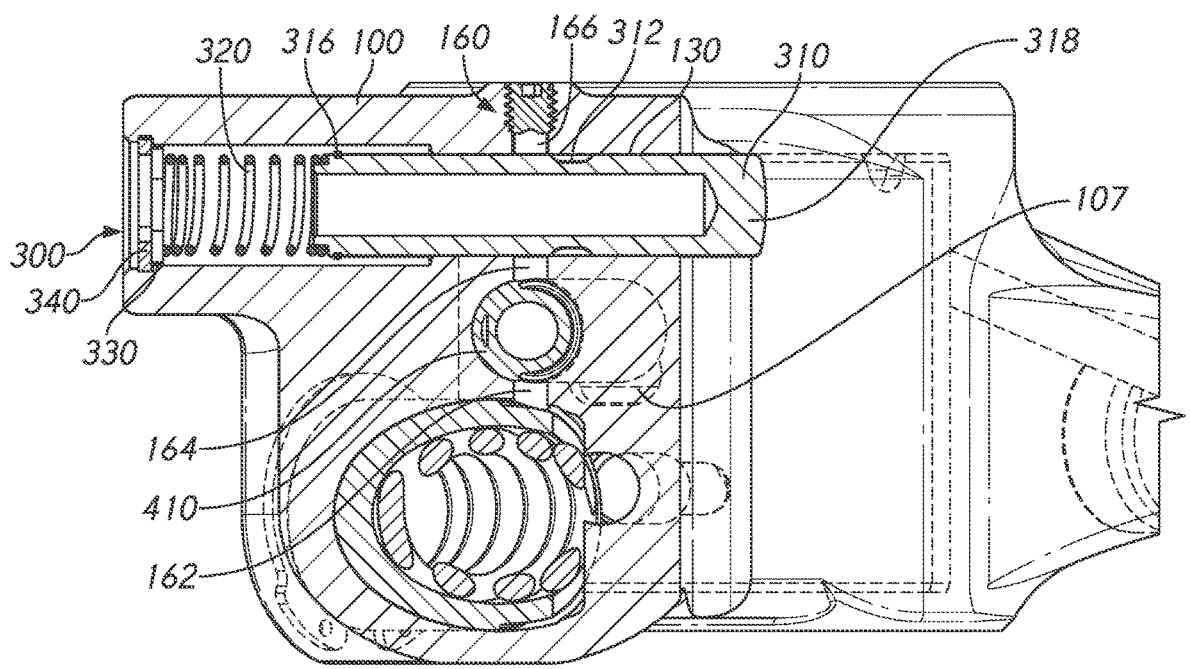
FIG. 8 is cross-section in a transverse plane of the example rocker arm of FIG. 1, showing a reset piston in a position or state corresponding to the beginning of a reset operation. The plane of this view coincides with the axis of the reset piston.

Referring particularly to FIGS. 5 and 6, actuator piston reset may be controlled through selective venting of oil through an actuator piston reset (or venting) passage 160 defined in the rocker arm body 100. Reset passage 160 may comprise a first portion 162, extending from the actuator piston bore 120 to the blocking piston bore 140, a second portion 164, extending from the blocking piston bore 140 to the reset piston bore 130, and a third portion 166 extending from the blocking piston bore 140 to a vent orifice 610, which may constitute a flow control component and may control the flow of working fluid from the reset passage 160 to the external engine overhead environment (external to the rocker arm). Control of flow of oil within the reset passage 160 may be controlled by the interaction of the blocking component 400 and the reset component 300 with the reset passage. Referring additionally to FIGS. 7 and 8, the reset component may control flow in the reset passage 160 and may comprise a reset piston assembly 300, which may include a reset piston 310, reset piston spring 320, reset piston spring retainer 330 and reset piston retainer 340. Reset piston may be dimensioned slide within and form a seal with the surface of reset piston bore 130. An annular groove or channel 312 provides for flow around the reset piston 310 when the annular groove 312 is aligned with the reset passage 160. A piston retaining ring 316 retains the piston 310 in the rocker arm body 100. A spring retaining shoulder 314 may be formed on an end of the reset piston 310 for engaging and supporting the reset piston spring 320 thereon. An opposite end of reset piston spring 320 engages a spring retainer 330 which is retained in place with a C-clip type reset piston retainer 340 which engages and expands into a groove in the rocker arm body 100. An external end 318 of the reset piston 310 may extend from the rocker arm body 100 and be biased in the extended direction by reset piston spring 320. External end 318 may engage a reaction surface that is external to the rocker arm and fixed with respect to the engine head in order to move the reset piston 310 relative to the rocker body to a reset state or position, as will be described further herein.

Referring again to FIGS. 5 and 6, a reset blocking component may comprise a blocking piston assembly 400, which may include a blocking piston 410, blocking piston spring 420, spring retainer 430 and blocking piston retainer 440. Blocking piston 410 may dimensioned to slide within and form sealing engagement with blocking piston bore or cavity 140. Blocking piston 410 may have an annular groove or channel 412 defined therein for permitting flow past the blocking piston when the annular groove 412 is aligned with flow passages in the rocker arm, as will be described. Blocking piston spring 420 may extend within a spring receptacle 412 on the interior of blocking piston and may engage a spring receptacle shoulder 414 therein. Blocking piston spring 420 may thus bias the blocking piston in a direction towards the rocker arm journal 102. An oil passage 107 on the rocker arm bushing/oil guide 104 may selectively provide a supply of oil to the bottom of the blocking piston bore 140 as commanded by a control solenoid 4 (FIG. 10) to cause the blocking piston 410 to move to a reset blocking position.

In FIG. 5, the blocking piston is shown in a "resetting position" where resetting is allowed to occur. The blocking piston annular passage 412 is aligned with the reset passage 160, allowing the high-pressure oil from the actuator piston bore 120 to pass through the reset passage portion 164 and into the reset piston bore 130. The reset piston can then dump oil from the hydraulic circuit when the rocker moves to the reset position.

In FIG. 6, the blocking piston 410 is shown in a "non-resetting" position. Oil is supplied to the bore for the piston through the passage 107 in the rocker arm bushing from the rocker shaft (not shown). Oil pressure exceeds the preload of blocking piston spring 420, and the blocking piston moves to a position in which it isolates the high pressure reset passage portion 162 from the actuator piston bore 140. High pressure oil is thus not permitted to escape from the circuit and reset or motion loss does not occur. This blocking of reset may thus provide for late closing intake motion on an intake valve. Advantageously, high pressure volume and the number of leakage paths is minimized with this arrangement. The operation of blocking piston 410 may be controlled based on one or more engine parameters, including engine speed, load, exhaust or oil temperature. Such control may implemented using a control solenoid, that may communicate with and is driven by an engine controller, to selectively supply oil to passage 107 to switch between the operating modes, which modes may be a Miller cycle and normal valve closing, as desired, based on engine operating parameters.

FIG. 7 illustrates the reset piston 310 in a position or state corresponding to cam base circle. In this position or state, reset piston 310 blocks reset passage 160 by preventing oil flow from reset passage portion 164 to reset passage portion 166, thus preventing oil from escaping from the rocker arm body 100 regardless of the position of blocking piston 410. In this position, the reset piston external end 318 may be held by reset piston spring 320 in contact with a fixed component on the cylinder head (see FIGS. 13 and 14, for example).

FIG. 8 illustrates the reset piston 310 in a position corresponding to the beginning of a valve reset height. As shown, the reset piston 310 has moved in to open the reset passage 160 by beginning to align the annular passage 312 with the reset passage 160. If the blocking piston 410 is in the "resetting position" the oil from the actuator piston chamber may flow around the blocking piston 410 and through the reset piston annulus 312 to vent from the rocker arm to atmosphere. The reset passage vent orifice may regulate the rate of reset to smooth the transition between the two operating states.

Figure 9:
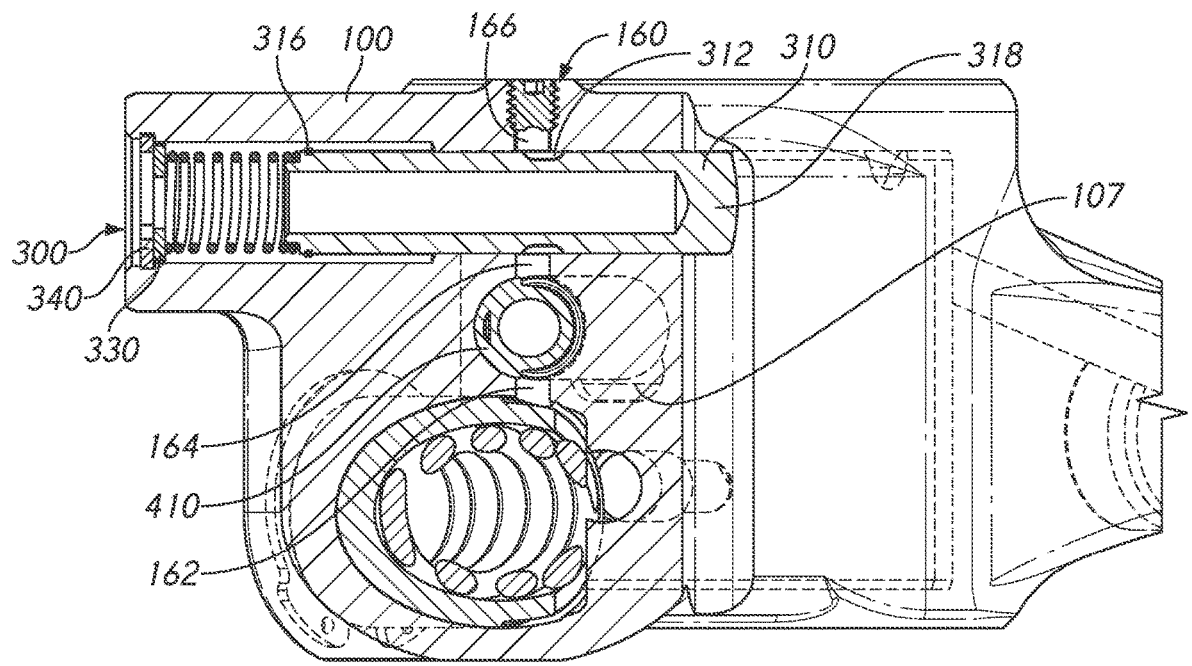
FIG. 9 is cross-section in a transverse plane of the example rocker arm of FIG. 1, showing a reset piston in a position or state corresponding to a peak lift position or state. The plane of this view coincides with the axis of the reset piston.

FIG. 9 illustrates the reset piston in a position corresponding to peak valve lift. As the rocker moves through its full main event lift the reset piston annulus 312 is further aligned with the reset passage to provide adequate flow area to dump all the actuator piston oil within the main event valve lift. The vent orifice may provide a reset rate that is fast enough to vent the oil during the main event, but slow enough to prevent shock loads through the valve train that may be caused by impact between the actuator piston and the bottom of the actuator piston bore.

As will be recognized from the instant disclosure, the configuration of the blocking piston 410 may be modified to achieve different operational characteristics. For example, while blocking piston, in the above example, is configured for "normally resetting" mode, in which the annular passage aligns with the reset passage 160 and permits oil flow through the reset passage when the working fluid supply is interrupted, the blocking piston could be alternatively configured, with appropriate repositioning of the annular groove or channel, for example, for a "normally not resetting" mode, in which the blocking piston blocks oil through the reset passage when the working fluid supply is interrupted. For example, the modes of operation such as "normally resetting" or "normally not resetting" can be selected based on an appropriate duty cycle for the two operating modes to minimize oil consumption.

Thus, as described above, there are two pistons connecting across the reset passage: the reset piston 310 that may reciprocate in the reset piston bore 130 to open and close the reset passage as the rocker arm moves through its main event lift; and the blocking piston 410 that may have two positions controlled by a blocking piston supply passage that can move the piston when oil is selectively supplied to its bore. In one position the reset piston is free to communicate with and vent working fluid via the reset passage. In another position the reset passage is blocked by the blocking piston and the reset piston is thus precluded from communicating with and venting the working fluid via the reset passage.

Figure 10:
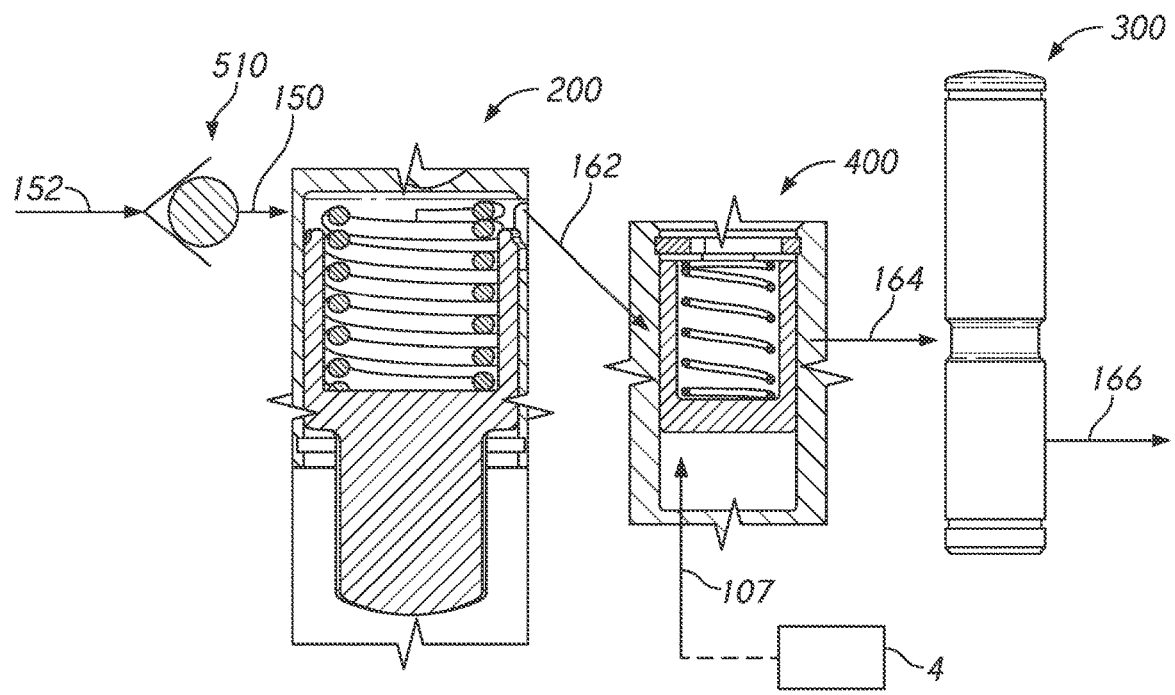
FIG. 10 is a schematic illustration of a portion of an example working fluid circuit including, from left to right, a checked fluid supply, actuator piston, blocking piston and reset piston.

FIG. 10 is a schematic illustration of a working fluid (i.e., hydraulic) circuit in accordance with the embodiment illustrated in FIGS. 1-10. As will be recognized from the instant disclosure, the constituent passages and components are integrated into a compact package within the rocker arm. The supply passage 152 may supply oil from an engine oil supply source (rocker shaft passages, for example) through check valve 510 and check valve bore 150 to the actuator piston assembly 200. Reset passage portion 162 conveys working fluid to the blocking piston assembly 400 and reset passage portion 164 conveys working fluid to the reset piston assembly 300. Passage portion 166 conveys working fluid from the reset piston assembly to the ambient engine environment, possibly through a vent orifice (not shown in FIG. 10).

Figure 15:
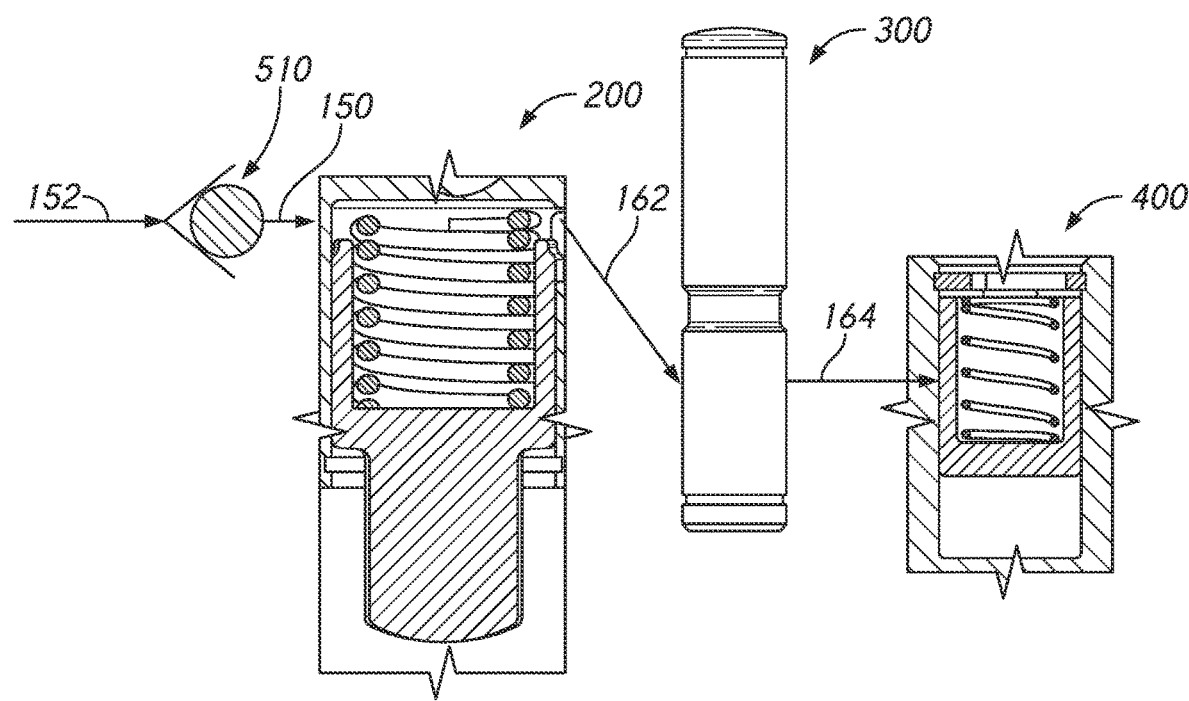
FIG. 15 is a schematic illustration of a portion of an example working fluid circuit, which is an alternative to FIG. 10, including, from left to right, a checked fluid supply, an actuator piston, a reset piston and a blocking piston.
Figure 16:
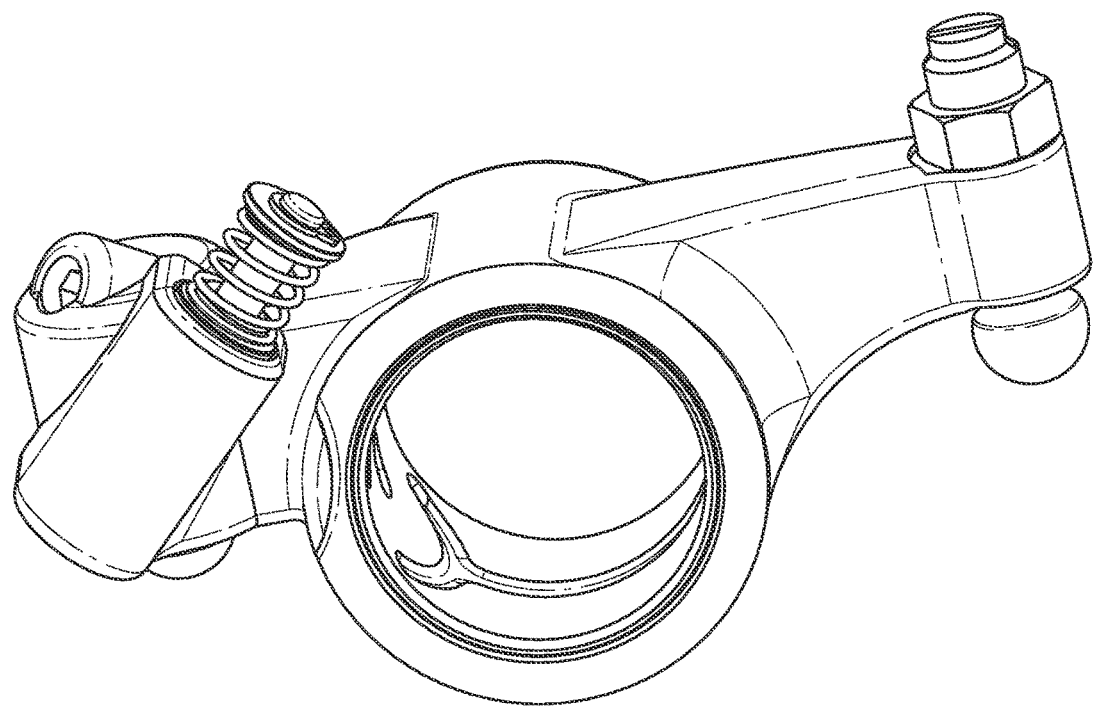
FIG. 16 is a perspective showing an alternative example rocker arm configuration in which a reset piston and blocking piston are disposed concentrically in a single bore.

This arrangement may be preferred due to advantageous packaging, reduced potential for leakage, and hydraulic volume benefits. However, will be understood from the instant disclosure that other arrangements of the components may be provided without departing from the inventive scope of the disclosure. For example, an alternate arrangement where the positions of the reset piston assembly and blocking piston assembly may be switched, as schematically illustrated in FIG. 15. As will be recognized from the instant disclosure, arrangement of the components may be optimized with due regard to the oil flow paths and minimization system losses due to oil flow and pressure demands of a particular configuration. For example, when the blocking piston is positioned as shown in the schematic in FIG. 10, there is only a single leak path—the clearance between the blocking piston and the blocking piston bore—where high-pressure oil may leak from the system. Thus, in this configuration, oil leakage only occurs in the blocking piston. On the other hand, the configuration of FIG. 15, while offering other advantages, may be susceptible to leakage of high-pressure oil past both the reset piston bore clearance and the blocking piston bore clearance. The annular passages and part of the drillings may be eliminated by positioning the blocking piston in close proximity to the actuator piston.

Figure 11:
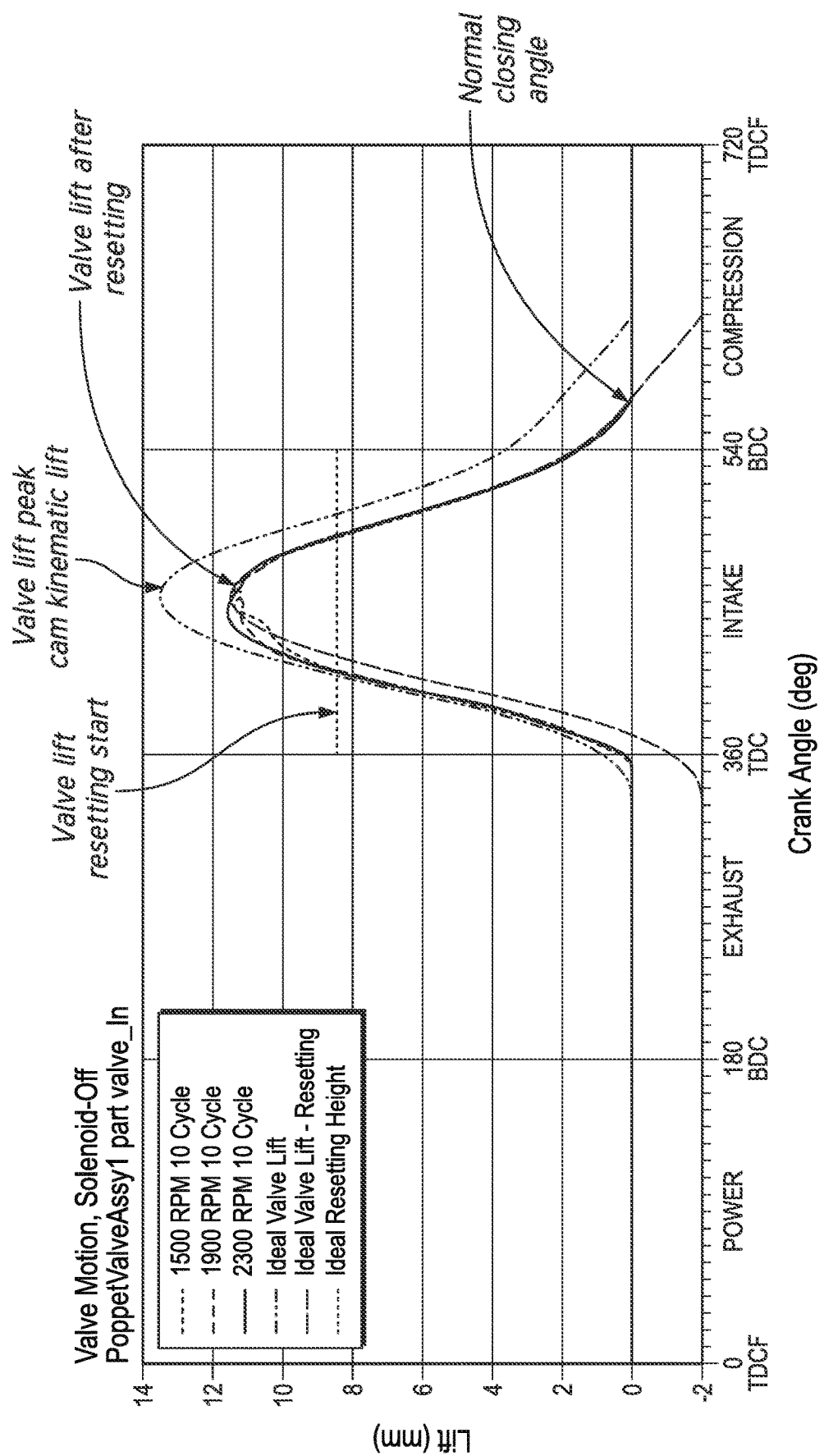
FIG. 11 is a graph showing example valve lift (mm) as a function of crankshaft rotation (degrees) at different engine rotational speeds (rpm). This figure illustrates an example resetting mode of operation.

FIG. 11 is a graphical illustration of the operation of the rocker arm of FIGS. 1-10, in the "resetting mode." As will be recognized from the instant disclosure, the "resetting mode" of operation corresponds to a normal valve closing profile. The depicted ideal valve lift is kinematic valve lift without any deflection of the valve train. The actual valve lift is shown for 1500, 1900, 2300 RPM. The actual valve lift includes deflection due to mechanical and hydraulic deflection of the system. In this particular configuration, at a valve lift height of 8.5 mm, the rocker arm may be in a rotational position in which the reset piston may engage an external contact surface and the annular channel of the reset piston may thus register with the reset passage and begin to vent out ("dump") the oil from the actuator piston. As a result, the valve motion "resets" from the high lift down to follow the "ideal lift resetting" curve that is characterized by a normal closing angle for positive power. This plot thus shows the system's ability, when in a resetting mode of operation, to provide a normal opening angle and closing angle as would normally be provided for positive power operation without modification of compression ratio "miller cycle." This is the lift curve desired for full compression ratio.

Figure 12:
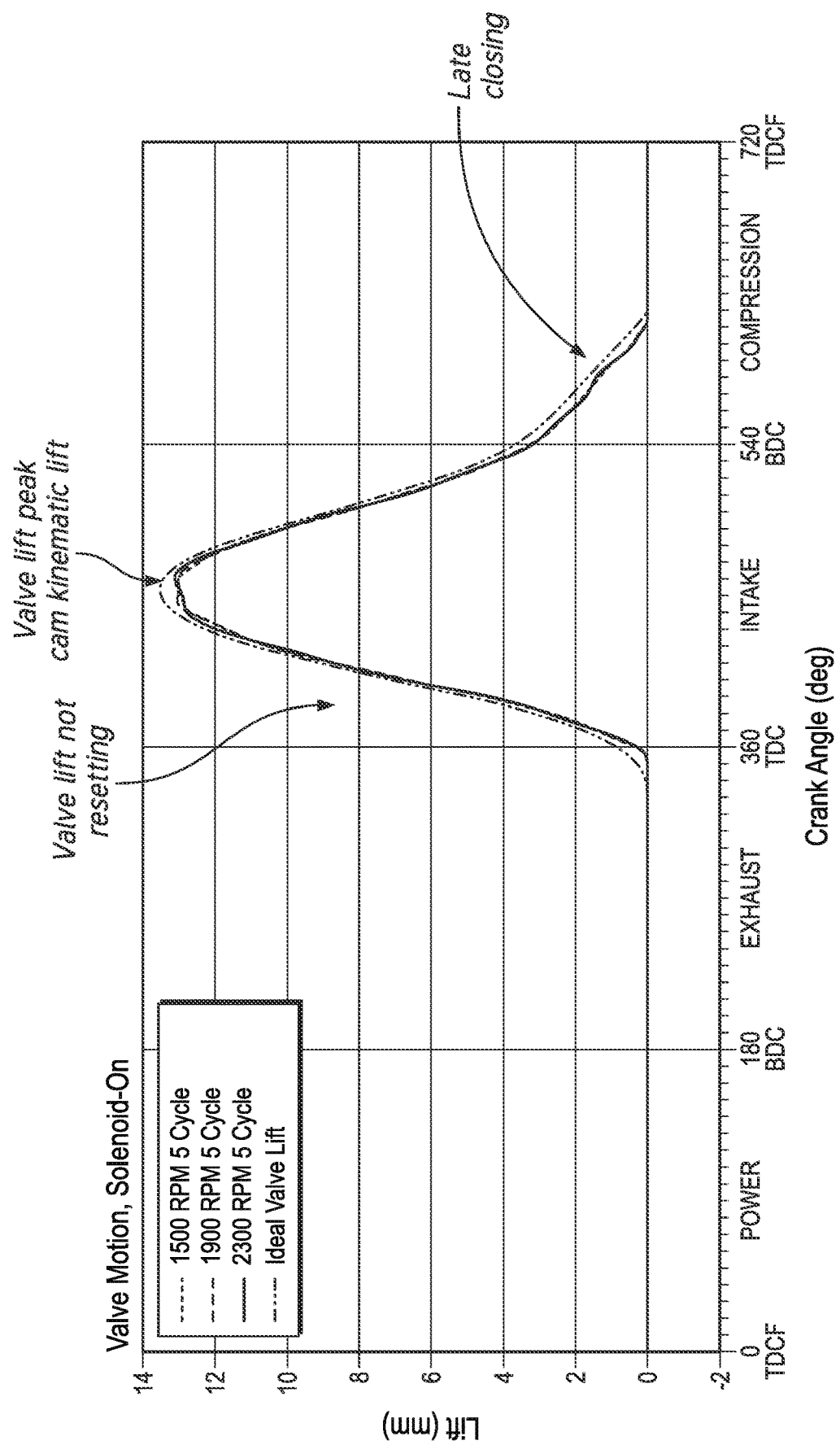
FIG. 12 is a graph showing example valve lift (mm) as a function of crankshaft rotation (degrees) at different engine rotational speeds (rpm). This figure illustrates an example late closing or non-resetting operational mode.

FIG. 12 shows a non-resetting mode of operation that corresponds to a "late closing" cycle for the associated valve. The ideal valve lift shown is kinematic without hydraulic or mechanical compliance. The actual valve motion is simulated for 1500,1900,2300 rpm. This actual motion includes mechanical and hydraulic compliance which reduce the lift compared to ideal. The open portion shows a small reduction in lift, and a retarding of timing due to this compliance. The "reset" in this figure is disabled by the blocking piston, and the oil is not permitted to vent from the actuator piston. The peak lift is increased and the late closing lift and later timing has been added to the lift curve. The late closing provides a lower compression ratio for improved fuel consumption and increased exhaust temperature desired for certain engine operating conditions.

Transition between the resetting and non-resetting operating modes may be controlled by an oil flow control solenoid or other component to move the blocking piston from the resetting state to the blocking state. For example, the control solenoid may be operated by an engine control unit (ECU) to selectively supply oil to move the blocking piston as desired to switch between Miller cycle and normal cycle operation. The ECU may implement various control strategies, which may vary depending on engine operational parameters, such as speed and load.

Figure 13:
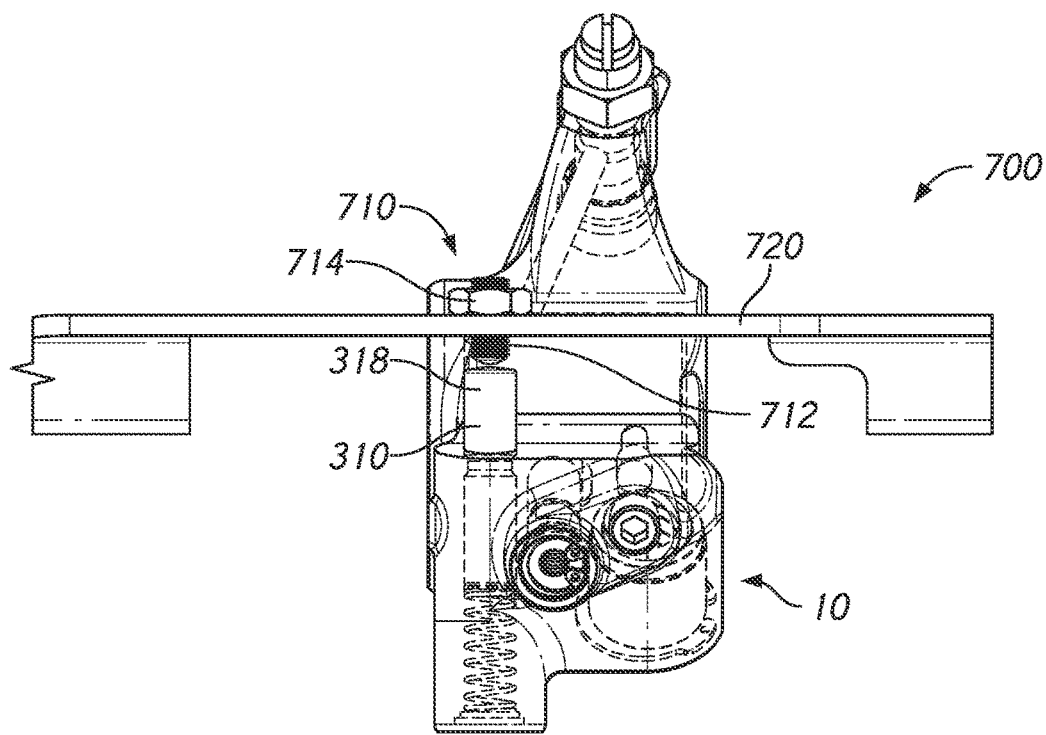
FIG. 13 is a top view perspective showing the example rocker arm of FIG. 1 installed in an engine environment having a reset contact surface.
Figure 14:
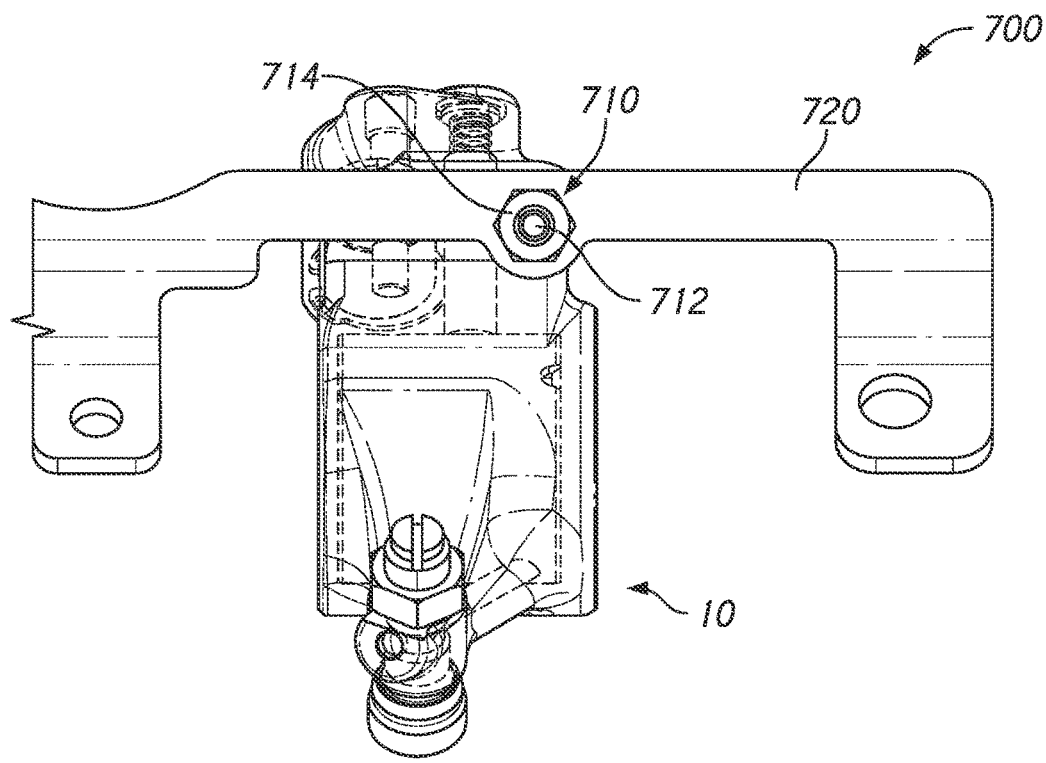
FIG. 14 is a side view perspective showing the example rocker arm of FIG. 1 installed in an engine environment having a reset contact surface.

FIGS. 13 and 14 show the rocker arm 10 of FIGS. 1-10 above, installed in an engine overhead environment having a reset piston contact assembly 700 that may include an adjustment feature 710 for setting the reset position and controlling the height of the reset. As will be recognized, some features of the engine environment, such as the rocker shaft, are omitted from FIGS. 13 and 14 for clarity. Moreover, while one adjustment feature 710 is illustrated, it will be recognized that contact assembly 700 may include multiple adjustment features, each for a respective associated rocker in a multiple cylinder environment. The feature 710 may include a set screw or other threaded fastener 712 extending through a threaded bore in an L-shaped bracket 720 that may be formed from a suitable gauge (thickness) metal stamping and fastened with threaded bolts (not shown) through holes 730 to the cylinder head or to any object in the overhead environment that is fixed relative to the rocker arm. An end of the setscrew 712 provides a reaction surface for engaging the external end 318 of reset piston 310. A locking nut 714 maintains the set screw 720 in a precise locked position. As the rocker moves (rotates on the rocker shaft) the reset piston contacts this reaction surface and moves inward relative to the rocker arm to cause resetting of the actuator piston, and thus loss of motion otherwise conveyed by the actuator piston, at a precise rotational position of the rocker arm.

It will be recognized by the instant disclosure that the orientation of the contact assembly and adjustment feature may be modified. For example, the bracket 720 may include a surface that extends horizontally, vertically or any orientation. Moreover, the reaction surface position may be modified such that the reset piston may be maintained in a retracted position (i.e., moved into the reset piston bore) and allowed to extend from the bore when the rocker arm moves away from the reaction surface.

FIGS. 16-21 illustrate another example rocker arm configuration as an alternative to the example of FIGS. 1-16 above. This variant may comprise concentrically arranged elements to provide the blocking and resetting components in a single bore or cavity in the rocker arm, which reduces machining cost and complexity with regard to the rocker arm. This configuration may be viewed essentially as a spool valve within a spool valve.

Figure 17:
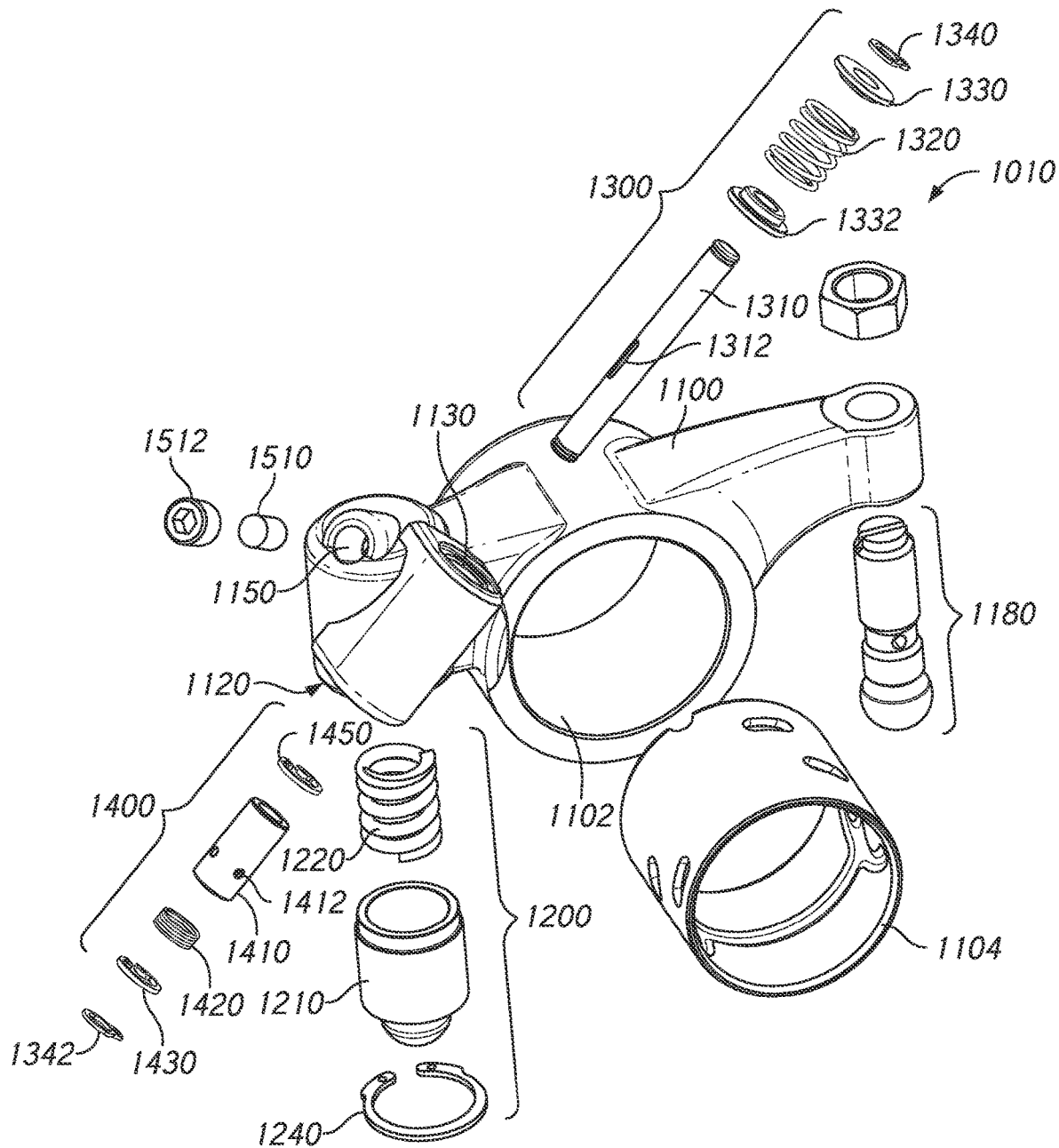
FIG. 17 is an exploded perspective view of the example rocker arm of FIG. 16.

Referring particularly to FIG. 17, which is an exploded perspective view, a rocker arm 1010 may have similar features to the embodiment of FIGS. 1-16, and may include a rocker arm body 100, having a rocker arm journal 1102, and swivel foot assembly 1180 at one end. An actuator piston assembly 1200 may include an actuator piston 1210, actuator piston spring 1220 and retainer 1240 disposed in an actuator piston bore 1120 in the rocker arm body 1100. A check valve 1510 may be disposed in a check valve bore 1150, which may be plugged by a check valve bore plug 1512. A reset component may include a reset piston assembly 1300, and a blocking component may include a blocking sleeve assembly 1400, the details of which will be described. In accordance with the advantages of this example, the reset piston assembly 1300 and blocking sleeve assembly 1400 may be disposed in a single bore 1130 in the rocker arm body 1100.

Reset piston assembly 1300 may include a reset piston 1310 having one or more longitudinally extending channels or grooves 1312 and a reset piston biasing assembly including a reset piston spring 1320 and a pair of reset piston spring retainers 1330 and 1332. A pair of piston retainer clips 1340 and 1342 may engage retaining slots on ends of the reset piston 1310 to retain the reset piston 1310 and other elements of the reset assembly 1300 and blocking assembly 1400 in place, as will be described.

Figure 18:
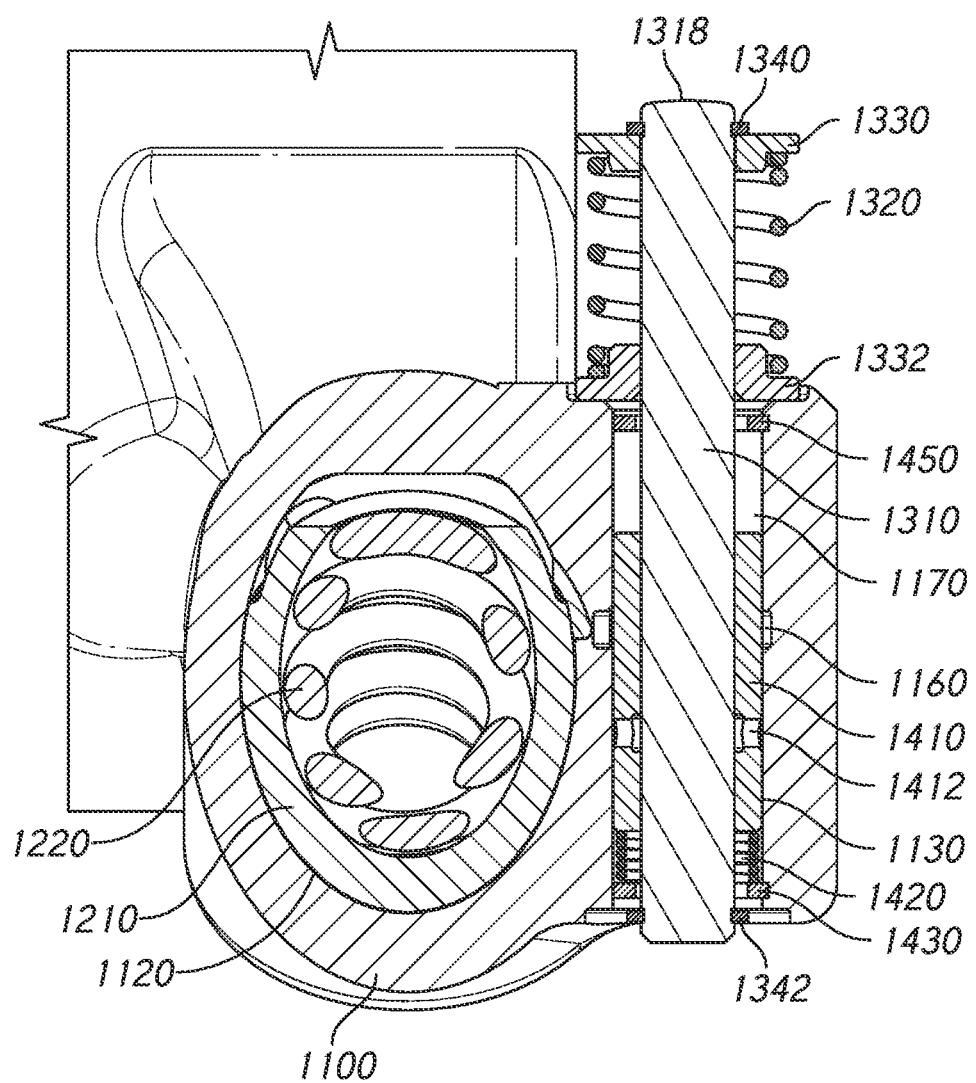
FIG. 18 is a cross-section in a transverse plane of the example rocker arm of FIG. 16, showing a reset piston and blocking sleeve in a reset blocking position or state. The plane of this view coincides with the axis of the reset piston and blocking sleeve.

Blocking sleeve assembly 1400 may include a blocking sleeve 1410 having one or more radially extending blocking sleeve ports 1412, a blocking sleeve spring 1420, blocking spring retainer 1430 and a blocking sleeve travel limiter 1450. Referring particularly to FIG. 18, which illustrates an assembled version of the elements of FIG. 17, blocking sleeve 1410 is disposed in bore 1130 concentrically with the reset piston 1310. Blocking sleeve spring 1420 abuts one end of the blocking sleeve 1410 and is retained in position on another end by blocking sleeve spring retainer 1430, secured within a channel in the rocker arm body 1100. Blocking sleeve 1410 is thus biased upward in FIG. 18 by the blocking sleeve spring 1420. Blocking sleeve travel limiter 1450 defines an upper travel limit for blocking sleeve 1410. Reset piston 1310 extends through the blocking sleeve 1410 and blocking sleeve spring 1420 and is retained at one (lower) end by reset piston retainer 1342. An upper reset piston retainer 1340 likewise retains the position of reset piston 1310 relative to other elements. Reset piston spring 1320 is supported between the reset spring retainers 1330 and 1332 and disposed concentrically relative to the reset piston 1310. Reset piston spring provides an upward biasing force on the reset piston 1310. An external end 1318 of the reset piston 1310 extends from the rocker arm body and may engage an external reaction surface during operation.

FIG. 18 shows the mechanism in the reset blocked position. A reset passage may include an annular channel 1160 formed in the rocker arm body 1100 and concentric with the reset piston 1310 and blocking sleeve 1410. Annular channel 1160 may be in fluid communication with the actuator piston chamber to permit flow of oil and reset. In FIG. 18, the blocking sleeve 1410 is disposed in a lower position to block the annular channel 1160. The blocking sleeve 1410 may be moved downward, against the biasing force of the blocking sleeve spring 1420, by pressurizing an upper chamber 1170, defined by the annular blocking sleeve 1410, the rocker arm chamber bore 1130, reset piston 1310 and sleeve travel limiter 1450, with selective supply oil. Chamber 1170 may be selectively pressurized by an oil control solenoid in fluid communication with an oil passage connected to the rocker shaft passage. The oil control solenoid may be controlled by an engine ECU.

Figure 19:
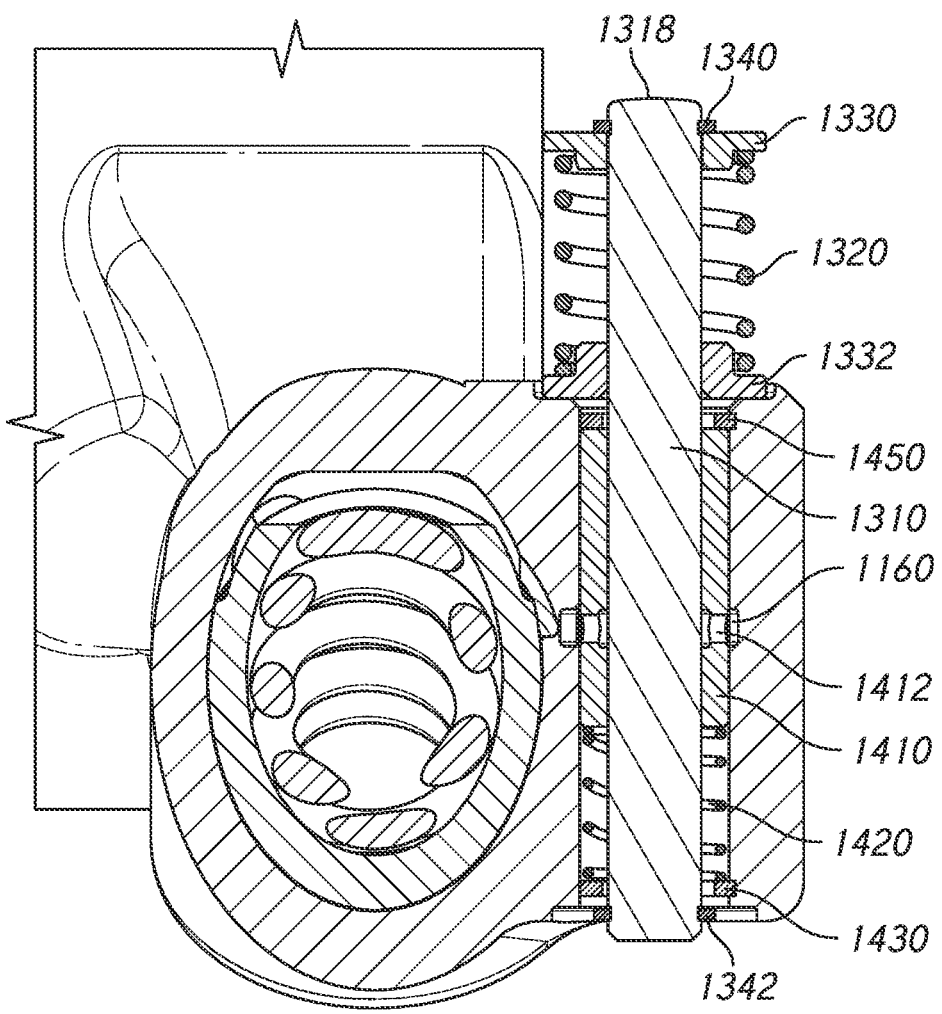
FIG. 19 is a cross-section in a transverse plane of the example rocker arm of FIG. 16, showing a reset piston and blocking sleeve in a resetting position or state. The plane of this view coincides with the axis of the reset piston and blocking sleeve.
Figure 20:
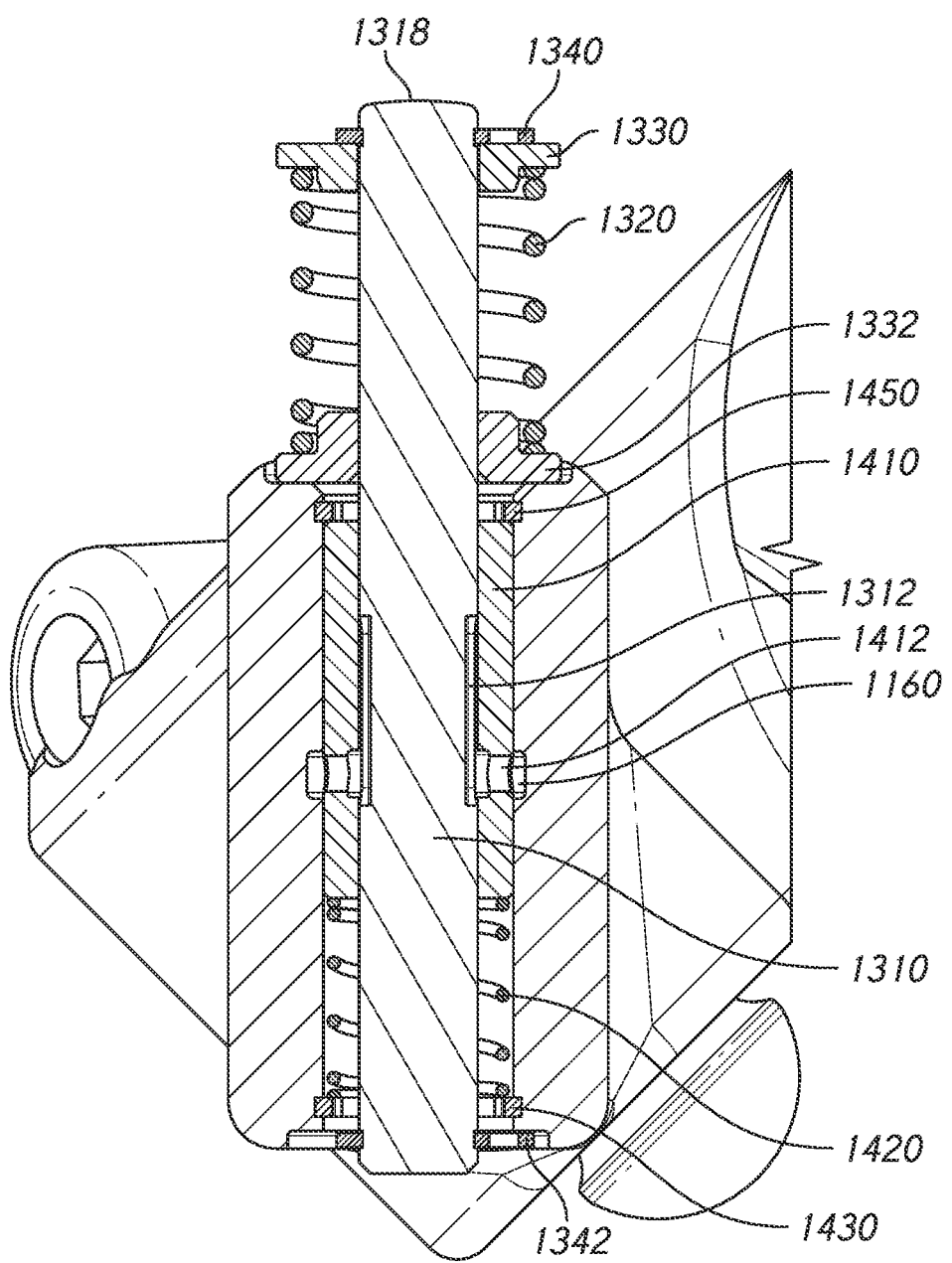
FIG. 20 is a cross-section in a transverse plane of the example rocker arm of FIG. 16, showing a reset piston and blocking sleeve in a reset active position or state with the reset piston positioned at base circle and reset not yet occurring. The plane of this view is orthogonal to the plane of FIG. 19 to show longitudinal passages on the reset piston and coincides with the axis of the reset piston and blocking sleeve.

FIG. 19 shows the mechanism in a reset active position. The blocking sleeve 1410 is moved upward to index the sleeve ports 1412 with the reset passage annulus 1160 to provide fluid communication between the actuator piston bore 1120 and the reset piston longitudinal channels 1312 (see FIGS. 20 and 21). In FIGS. 19 and 20, however, the reset piston is shown on base circle position. Therefore, in this position, the reset piston 1310 prevents oil from being vented from the actuator piston chamber.

Figure 21:
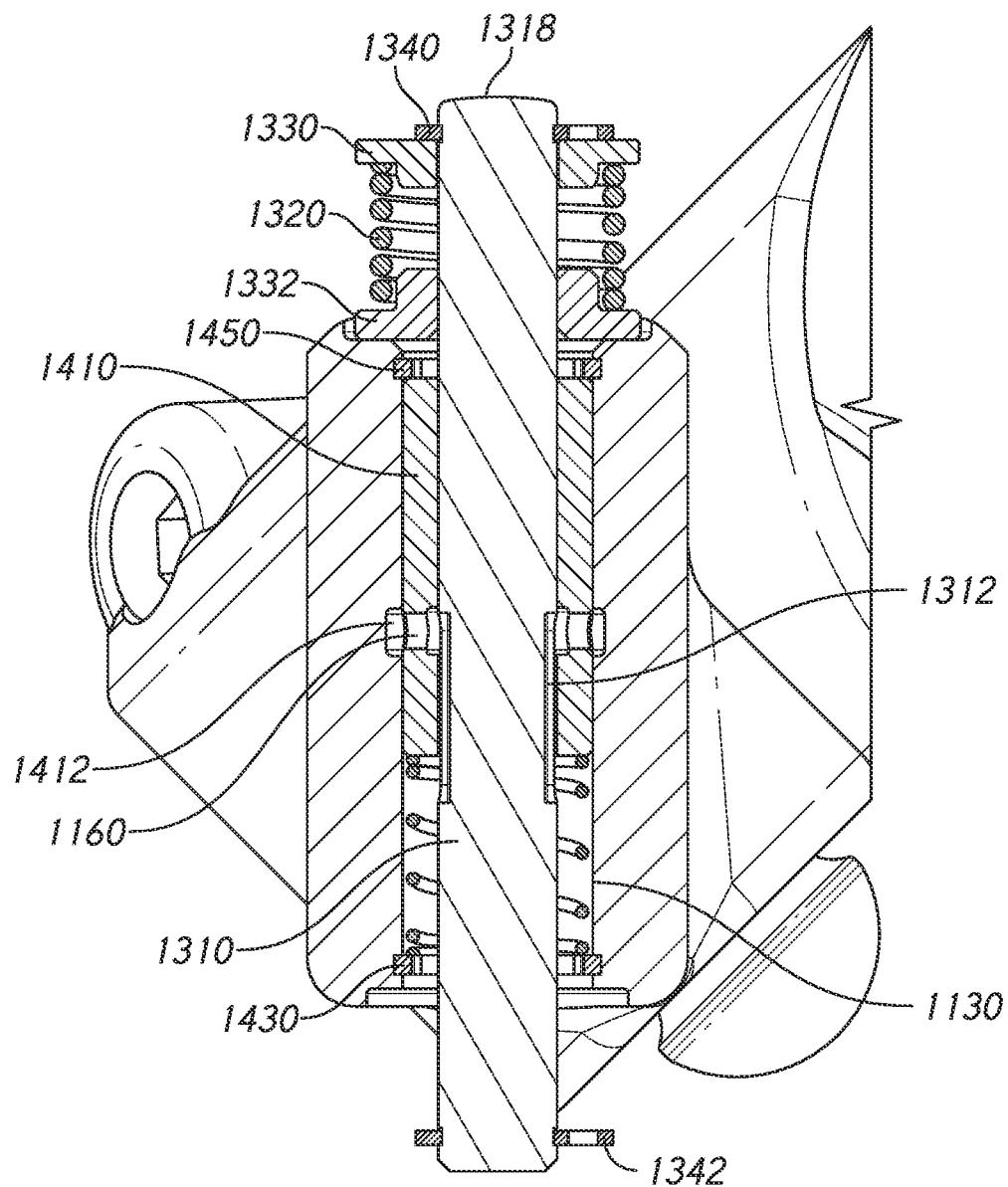
FIG. 21 is a cross-section taken from the same view as FIG. 20, with the reset shown in the peak lift position with the reset passage venting oil from the annulus to the bottom of the sleeve.

FIG. 21 shows the reset piston 1310 at peak valve lift and the blocking piston 1410 in the reset active position. In this position, the longitudinal channels 1312 on the reset piston 1310 are positioned to connect the blocking sleeve ports 1412 to the lower portion of bore 1130, which permits the actuator piston chamber oil to evacuate to ambient and the reset of the actuator piston to occur.

Figure 22:
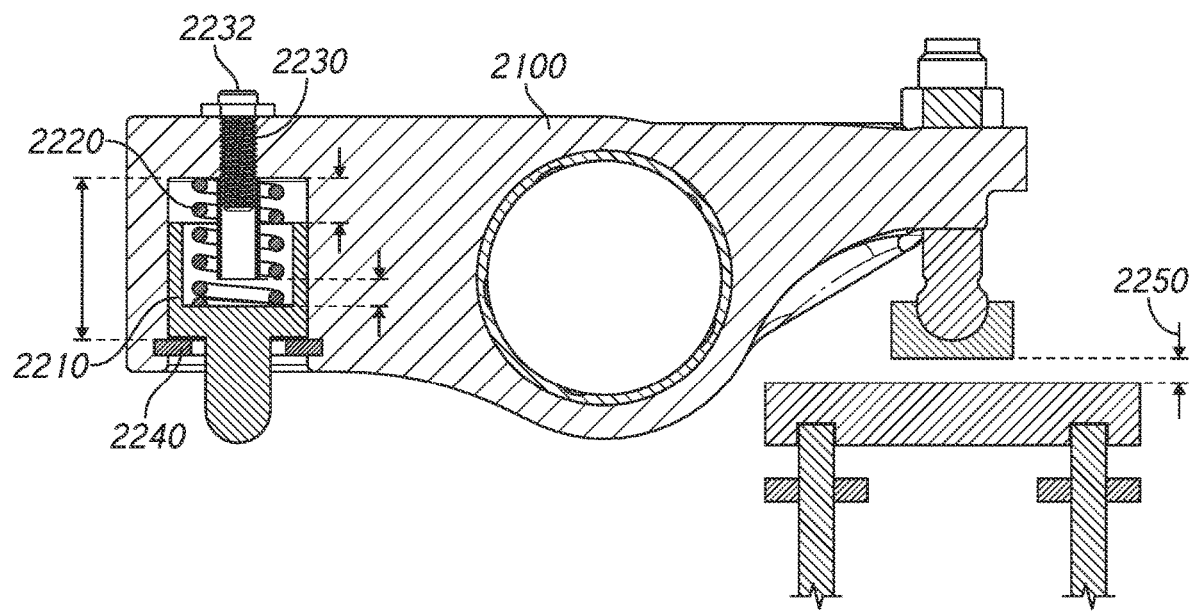
FIG. 22 is a cross-section of an alternative example rocker arm to the configurations of FIG. 1 and FIG. 16.

In the embodiments described above, having the actuator piston spring biasing force applied to the valve train components, such as the pushrod and follower, may lead to excessive wear on the rocker arm bushing and other components that may not be properly lubricated when constantly loaded. FIG. 22 illustrates an adjustment system for addressing such problems by using an alternative arrangement for an actuator piston 2210 that may provide stroke limits and precise stroke control. In this version the outward travel of the actuator piston 2210 may be limited by a retaining ring 2240. A bias spring 2220, which may constitute a rocker arm biasing component, located inside an actuator piston 2210 applies a bias force towards the outward (extended) direction. Upward travel of the actuator piston 2210 may be controlled by an adjusting screw 2230 and jam nut 2232 is added to set the stroke of the actuator piston accurately to account for manufacturing variation. Alternatively, as will be recognized from the instant disclosure, it may be possible, by match fitting and very high levels of precision, or by addition of various thickness shims, to control the actuator piston stroke without the lash setting screw. When the cam is on base circle, travel of the piston 2210 is stopped by the retaining ring 2240. On base circle, the rocker arm 2100 may have a lash space 2250 in the valvetrain that is not taken up by the actuator piston stroke. In this configuration, only during the cam lift portion greater than the lash ~0.4 mm will the actuator piston spring load the pushrod. Preferably, the distance from the actuator piston to the bottom of the bore is greater than the stroke needed for lost motion.

The system of FIG. 22 provides a simple configuration in that the stroke of the actuator piston is set by the singular adjusting screw located on the motion receiving end of the rocker arm. Setting the stroke may be done easily by using a suitable thickness feeler gage beneath the e-foot, and, for example, adjusting until the actuator piston bottoms out in the bore. Setting the stroke may be done with the screw 2232 on the motion receiving end and may be factory set using a fixture that measures travel, and locked indefinitely. Setting the lash can be done with the screw on the motion imparting side to accommodate engine tolerances and wear over time. A tamper proof method may be used so that the stroke is not changed by the end user.

Figure 23:
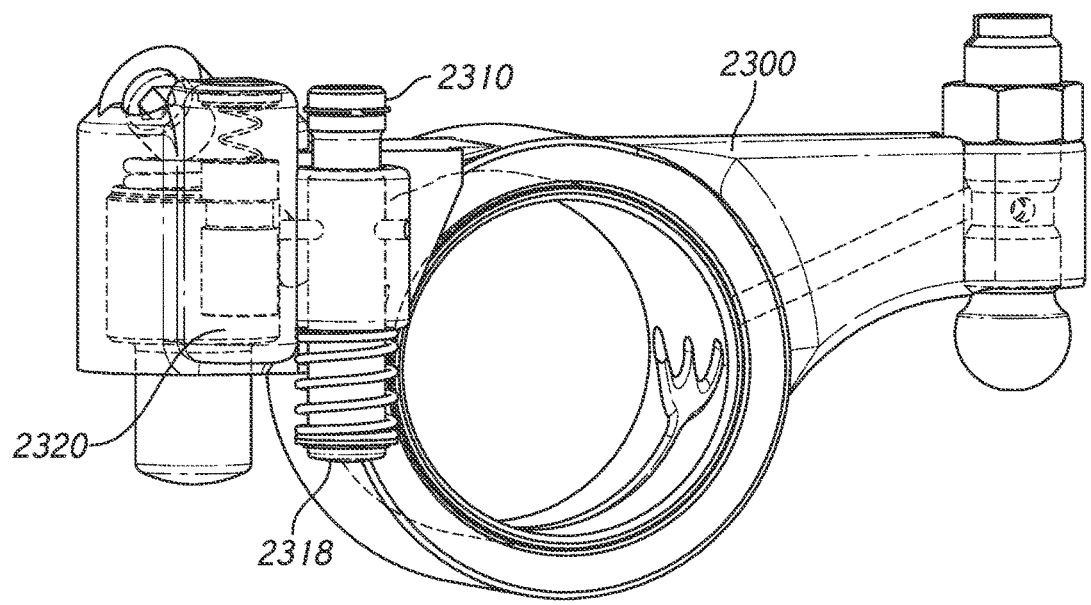
FIG. 23 is a perspective of the example rocker arm according to an alternative embodiment.

FIG. 23 illustrates an alternative packaging arrangement of reset piston and separate blocking piston in a rocker arm. The internal components are similar to those described in FIGS. 1-16 above. However, in this configuration, the orientation of the reset piston 2310 is reversed, such that the reset piston end 2318 is facing downward. With this configuration, motion of the rocker arm may extend of the reset piston relative to the rocker arm bore. This may be more suitable in some engines that to not have adequate overhead space for mounting a stamping, or in systems that already have a contact surface adjacent to the rocker arm. A reset surface (not shown in FIG. 23), beneath the reset piston may act on the lower surface 2318 of piston 2310. On the base circle the piston 2310 will be displaced upwards relative to the rocker arm 2320. During main event lift the rocker arm 2320 will rotate and move upwards relative to reaction surface and piston 2310 will remain down against the reaction surface, and move outward relative to the bore in rocker arm 2320. The reset piston may essentially remain in contact with the stationary reaction surface, however, and move relative to the rocker arm as the rocker reciprocates.

Although the present implementations have been described with reference to specific example embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A valve actuation system for conveying motion from a motion source to at least one engine valve in a valve train in an internal combustion engine comprising:
    a housing adapted to support components of the system;
    a lost motion component disposed in the housing for selectively conveying motion from the motion source to the housing, the lost motion component adapted to absorb motion provided from the motion source in a lost motion state;
    a reset component for resetting the lost motion component to the lost motion state; and
    a reset blocking component for selectively preventing reset of the lost motion component.

2. The valve actuation system of claim 1, further comprising a working fluid circuit, at least partially defined in the housing, for controlling the flow of working fluid to the lost motion component.

3. The valve actuation system of claim 2, wherein the working fluid circuit further comprises a working fluid supply and a backflow prevention component for preventing backflow of working fluid from the lost motion component to the working fluid supply.

4. The valve actuation system of claim 3, wherein the backflow control component is a check valve disposed in the working fluid circuit.

5. The valve actuation system of claim 2, wherein the working fluid circuit further comprises a flow control component for controlling a flow of working fluid from the reset component.

6. The valve actuation system of claim 2, wherein the reset component and reset blocking component form part of the working fluid circuit.

7. The valve actuation system of claim 2, wherein the working fluid circuit further comprises a working fluid circuit control component for controlling the lost motion component based on at least one engine parameter, including engine load, engine speed, engine temperature and exhaust temperature.

8. The valve actuation system of claim 1, wherein the motion source includes a valve closing profile for imparting valve closing motion to the valve train, and wherein the reset component is arranged to reset the lost motion component to absorb at least a portion of the valve train valve closing motion.

9. The valve actuation system of claim 1, wherein the reset component comprises a reset valve.

10. The valve actuation system of claim 1, wherein the reset blocking component comprises a reset blocking valve.

11. The valve actuation system of claim 1, wherein the housing is a rocker arm and wherein the reset component and reset blocking component are integrated into the rocker arm.

12. The valve actuation system of claim 1, wherein the housing is a rocker arm mounted on a rocker shaft and wherein the reset component is arranged to reset the lost motion component based on an angular position of the rocker arm relative to the rocker shaft.

13. The valve actuation system of claim 1, wherein the reset component comprises a reset piston, and wherein the reset blocking component comprises a sleeve cooperating with the reset piston.

14. The valve actuation system of claim 1, further comprising an internal combustion engine, the internal combustion engine further comprising a contact surface, wherein the housing is arranged to move relative to the contact surface and wherein the reset component is adapted to engage the contact surface as the housing moves relative to the contact surface.

15. The valve actuation system of claim 1, wherein the housing comprises a rocker arm, the system further comprising a rocker arm biasing component for biasing the rocker arm.

16. The valve actuation system of claim 1, wherein the lost motion component further comprises an actuator piston and a lost motion biasing component for biasing the actuator piston towards an extended position.

17. The valve actuation system of claim 16, further comprising a lash adjustment component for setting a stroke of the lost motion component.

18. The valve actuation system of claim 1, further comprising at least one blocking component actuator to actuate the blocking component.

19. The valve actuation system of claim 1, wherein the lost motion component further comprises an actuator piston and a motion limiter for limiting the motion of the actuator piston.

20. A method of controlling valve motion in a valve actuation system in an internal combustion engine, the valve actuation system comprising: at least one engine valve in a valve train in an internal combustion engine; a housing adapted to support components of the valve actuation system; a lost motion component disposed in the housing for selectively conveying motion from a motion source to the housing, the lost motion component adapted to absorb motion provided from the motion source in a lost motion state; a high-pressure hydraulic reset component for resetting the lost motion component to the lost motion state; and a reset blocking component for selectively preventing reset of the lost motion component, the method comprising:
    operating the high-pressure hydraulic reset component to reset the lost motion component and cause the lost motion component to absorb motion from the motion source; and
    operating the reset blocking component to block flow of high-pressure hydraulic fluid from the high-pressure hydraulic reset component and to thereby block reset of the lost motion component.

21. The method of claim 20, wherein the step of operating the high-pressure hydraulic reset component comprises absorbing late valve closing motion provided by the motion source, and wherein the step of operating the reset blocking component causes late valve closing motion.

* * * * *